United States Patent
Satoh et al.

(10) Patent No.: US 11,430,195 B2
(45) Date of Patent: Aug. 30, 2022

(54) INFORMATION PROCESSING APPARATUS, INFORMATION PROCESSING METHOD, AND PROGRAM FOR IMPROVING USER-FRIENDLINESS OF AN ANIMATED TUTORIAL DEPICTING ASSEMBLING PARTS FOR CREATING A ROBOT

(71) Applicant: SONY CORPORATION, Tokyo (JP)

(72) Inventors: Ayaka Satoh, Kanagawa (JP); Mitsuo Okumura, Tokyo (JP); Takehiko Sasaki, Kanagawa (JP); Masaaki Isozu, Tokyo (JP); Shohei Takahashi, Tokyo (JP); Marika Nozue, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/320,808

(22) PCT Filed: May 30, 2017

(86) PCT No.: PCT/JP2017/019982
§ 371 (c)(1),
(2) Date: Jan. 25, 2019

(87) PCT Pub. No.: WO2018/042784
PCT Pub. Date: Mar. 8, 2018

(65) Prior Publication Data
US 2019/0172269 A1  Jun. 6, 2019

(30) Foreign Application Priority Data

Aug. 31, 2016 (JP) .............................. JP2016-168986

(51) Int. Cl.
*G06T 19/20* (2011.01)
*A63H 33/08* (2006.01)
(Continued)

(52) U.S. Cl.
CPC ........... *G06T 19/20* (2013.01); *A63H 33/042* (2013.01); *A63H 33/08* (2013.01); *G06T 13/20* (2013.01);
(Continued)

(58) Field of Classification Search
CPC ... H04N 21/47217; G06T 13/20; G06T 19/20; G06T 2219/2008; G05B 2219/31046;
(Continued)

(56) References Cited

U.S. PATENT DOCUMENTS 7,075,531 B1 * 7/2006 Ando ...................... G06T 13/80
345/420
2002/0113803 A1   8/2002 Samra et al.
(Continued)

FOREIGN PATENT DOCUMENTS

CN       1435791 A    1/2003
CN     101675458 A    3/2010
(Continued)

OTHER PUBLICATIONS

DesignInnovations; "Explode Assembly Drawing, Part 1, Explode Line Sketch"; Apr. 27, 2012; YouTube; "https://www.youtube.com/watch?v=VFTI1Hpfx3A"; 3:30/7:46 (Year: 2012).*
(Continued)

*Primary Examiner* — Kent W Chang
*Assistant Examiner* — Jonathan M Cofino
(74) *Attorney, Agent, or Firm* — Paratus Law Group, PLLC

(57) ABSTRACT

There is provided an apparatus which can improve user-friendliness of a description screen for assembly of parts in creation of a robot. The apparatus performs display control to separately display a plurality of parts for creation of a robot, display a line connecting joint surfaces of the respective parts, and display animation in which the respective
(Continued)

parts are jointed in accordance with the line connecting the joint surfaces in assembly order.

11 Claims, 42 Drawing Sheets

(51) Int. Cl.
*G09B 19/10* (2006.01)
*G06T 13/20* (2011.01)
*A63H 33/04* (2006.01)
*G09B 19/00* (2006.01)

(52) U.S. Cl.
CPC ......... *G09B 19/0053* (2013.01); *G09B 19/10* (2013.01); *A63H 2200/00* (2013.01); *G05B 2219/31046* (2013.01); *G06T 2219/2008* (2013.01)

(58) Field of Classification Search
CPC .... A63H 33/042; A63H 33/08; A63H 33/082; A63H 33/084; A63H 33/086; A63H 33/088
USPC ......................................................... 715/721
See application file for complete search history.

(56) References Cited

U.S. PATENT DOCUMENTS

| | | | | |
|---|---|---|---|---|
| 2005/0038564 | A1* | 2/2005 | Burick | B25J 5/007 700/245 |
| 2005/0231512 | A1* | 10/2005 | Niles | G06T 13/20 345/473 |
| 2011/0177703 | A1* | 7/2011 | Lin | H01R 25/006 439/131 |
| 2011/0179624 | A1* | 7/2011 | Sexton | A47B 97/00 29/428 |
| 2013/0203316 | A1* | 8/2013 | Uno | A63H 33/086 446/124 |
| 2014/0101550 | A1* | 4/2014 | Zises | G06F 3/01 715/721 |
| 2014/0115967 | A1* | 5/2014 | Lin | H01R 13/447 49/258 |
| 2014/0272905 | A1* | 9/2014 | Boersma | G09B 7/04 434/362 |
| 2014/0298223 | A1* | 10/2014 | Duong | G06F 3/04842 715/765 |
| 2015/0077421 | A1* | 3/2015 | Lehtiniemi | H04N 1/387 345/473 |

FOREIGN PATENT DOCUMENTS

| | | |
|---|---|---|
| CN | 102208205 A | 10/2011 |
| CN | 103180889 A | 6/2013 |
| CN | 103930182 A | 7/2014 |
| CN | 104081784 A | 10/2014 |
| CN | 204229690 U | 3/2015 |
| JP | 2003-051031 A | 2/2003 |
| JP | 2006-146835 A | 6/2006 |
| JP | 2014-238476 A | 12/2014 |
| JP | 2015-136451 A | 7/2015 |

OTHER PUBLICATIONS

Engineering Technology Simulation Learning Videos; "Section Views: What are they and How to Create one"; Jun. 15, 2015; YouTube ("https://www.youtube.com/watch?v=0x4Mq3plkEw"); 2:05-2:27 (Year: 2015).*

Swartz, Ryan; "Solidworks 2013 change line types"; Mar. 4, 2014; YouTube ("https://www.youtube.com/watch?v=FwxnEYOZm7A"); 0:18-0:37 (Year: 2014).*

Manriki Kumitate, https://www.youtube.com/watch?v=wxs2UKG8F_k, Published on May 22, 2014, Retrieved on Aug. 7, 2017.

VPS/Viewer (Mushoban) V15L14 Teikyo Kaishi!, https://www.youtube.com/watch?v=fcg5kP5-CXI, Published on Jan. 15, 2014, Retrieved on Aug. 7, 2017.

Mu et al., SolidWorks Project Tutorial, Jun. 30, 2015, pp. 195-197, first edition, China Science and Technology University Press.

* cited by examiner

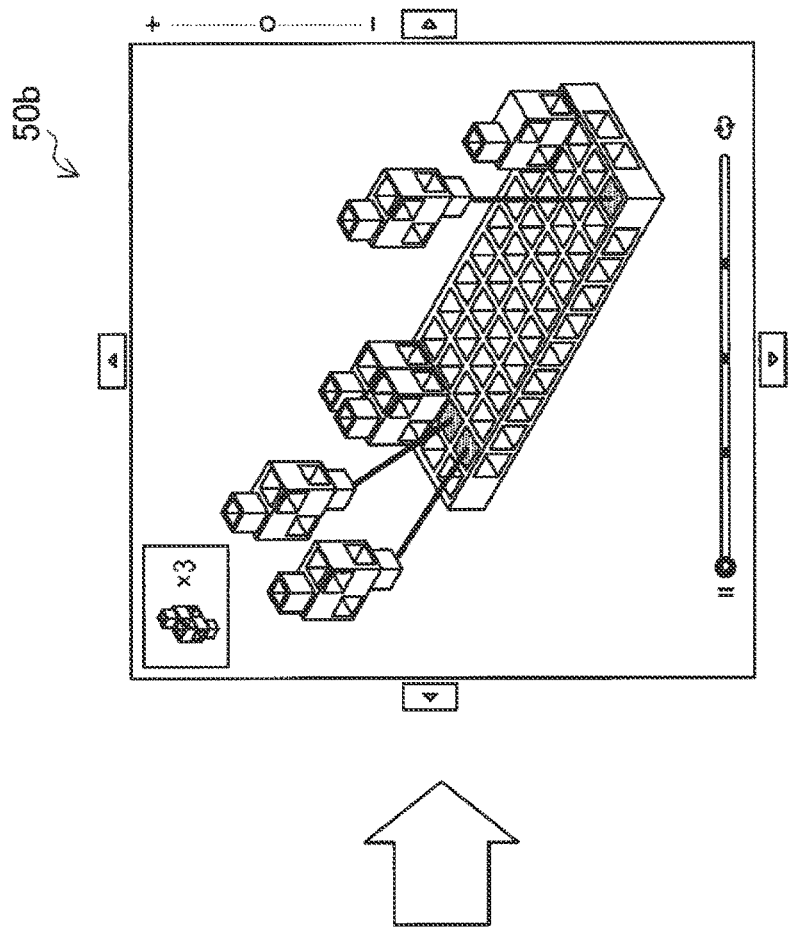
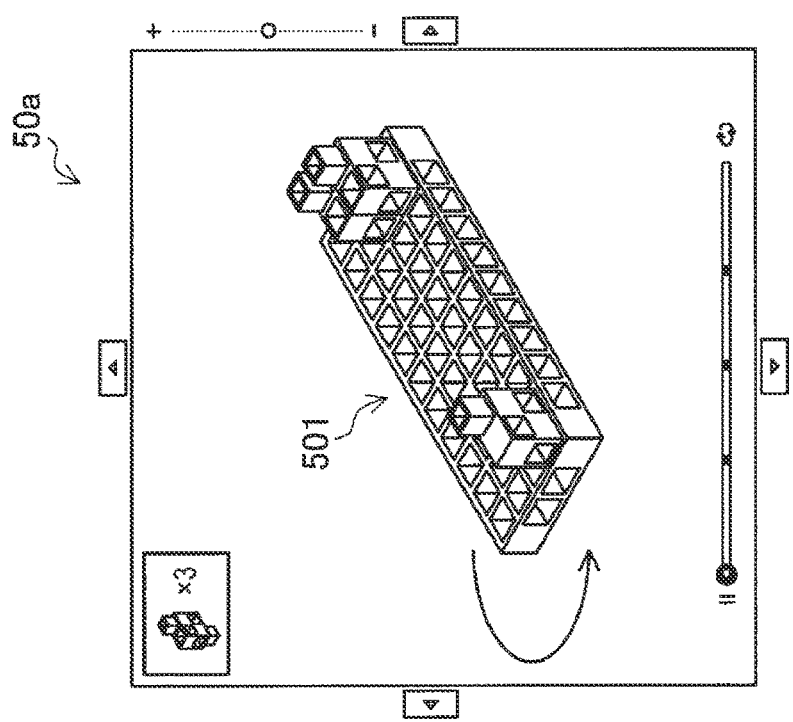
FIG. 31

FIG. 39
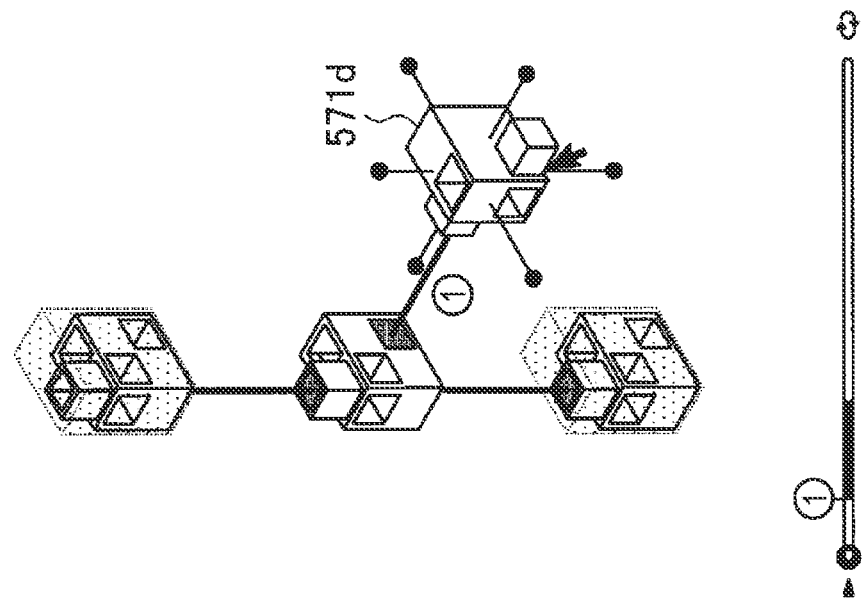
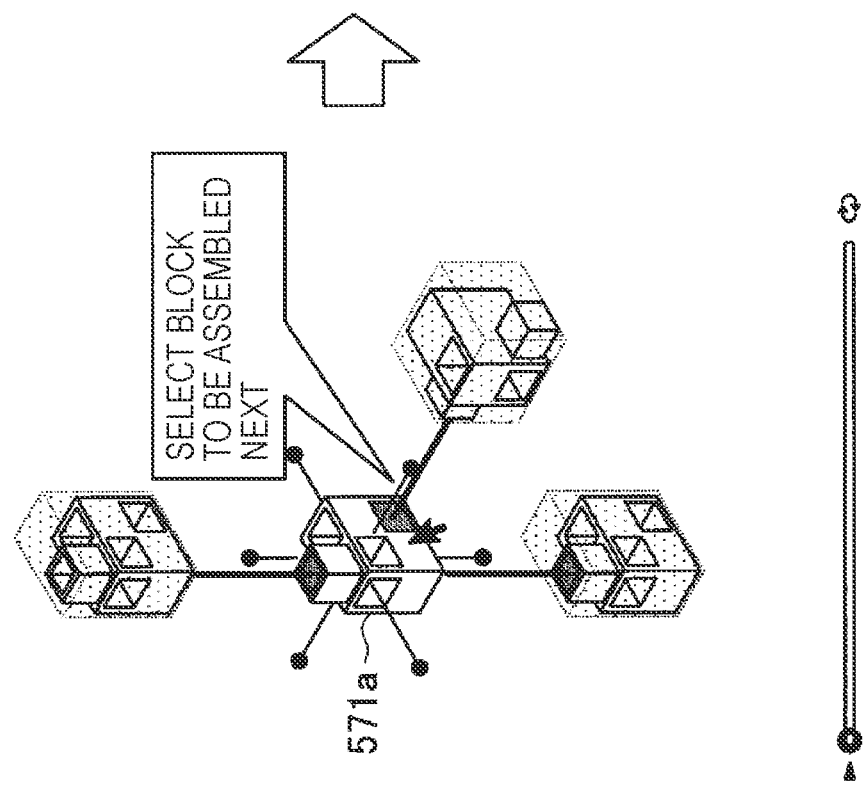

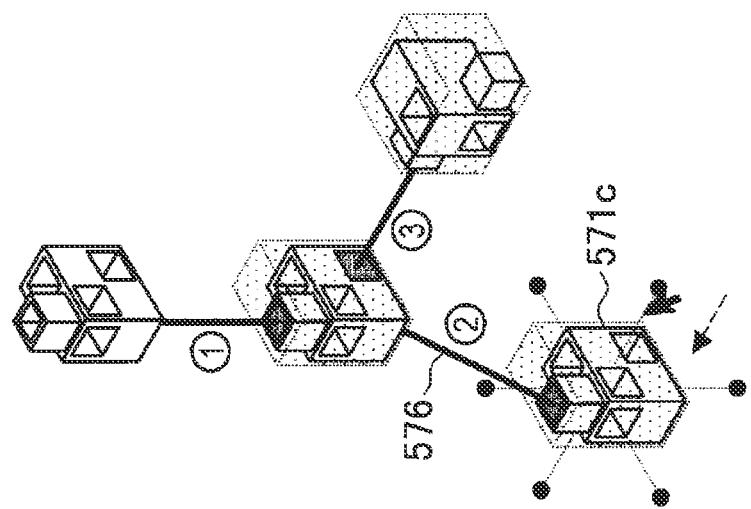
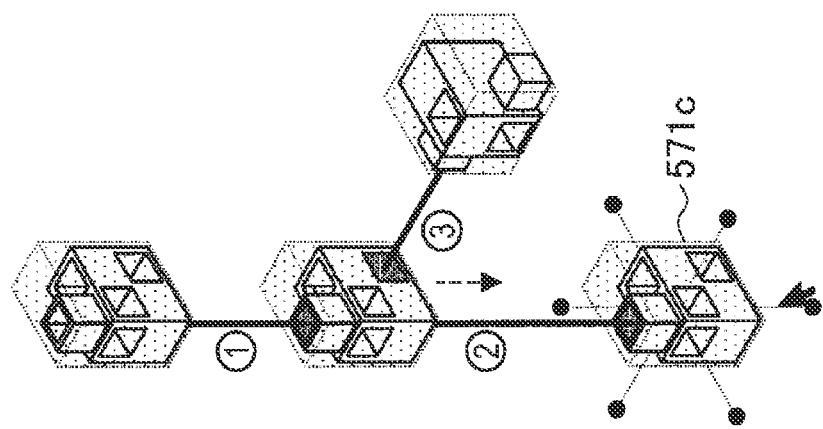
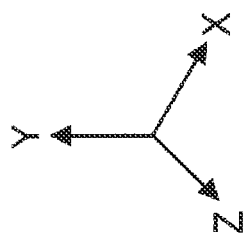
FIG. 41

INFORMATION PROCESSING APPARATUS, INFORMATION PROCESSING METHOD, AND PROGRAM FOR IMPROVING USER-FRIENDLINESS OF AN ANIMATED TUTORIAL DEPICTING ASSEMBLING PARTS FOR CREATING A ROBOT

CROSS REFERENCE TO PRIOR APPLICATION

This application is a National Stage Patent Application of PCT International Patent Application No. PCT/JP2017/019982 (filed on May 30, 2017) under 35 U.S.C. § 371, which claims priority to Japanese Patent Application No. 2016-168986 (filed on Aug. 31, 2016), which are all hereby incorporated by reference in their entirety.

TECHNICAL FIELD

The present disclosure relates to an information processing apparatus, an information processing method, and a program.

BACKGROUND ART

In related art, a toy for creating objects having various shapes by assembling a number of blocks is in widespread use. In recent years, electronic components such as a sensor, a motor, a control unit and a battery are also used in creation of a robot. The created robot is controlled by application installed in a control unit.

Concerning a technology of adding application to an electronic device, for example, the following Patent Literature 1 discloses a software installing method of additionally installing an additional function module to application which has been already installed in the electronic device. Further, as the electronic device disclosed in Patent Literature 1, an arbitrary device such as a host computer, a measurement device, an industrial robot, sewing machine and an image processing apparatus, which performs predetermined operation by a program being executed by a computer is assumed.

CITATION LIST

Patent Literature

Patent Literature 1: JP 2006-146835A

DISCLOSURE OF INVENTION

Technical Problem

However, when a robot is created in accordance with description, there is a case where it is difficult only from the description and an image of an assembled completed robot to understand, for example, how concavities and convexities provided at respective blocks are fitted.

Therefore, the present disclosure proposes an information processing apparatus, an information processing method, and a program which can improve user-friendliness of a description screen for assembly of parts in creation of a robot.

Solution to Problem

According to the present disclosure, there is proposed an information processing apparatus including a control unit configured to perform display control to: separately display a plurality of parts for creation of a robot, display a line connecting joint surfaces of the respective parts, and display animation in which the respective parts are jointed in accordance with the line connecting the joint surfaces in assembly order.

According to the present disclosure, there is proposed an information processing method including performing display control by a processor to: separately display a plurality of parts for creation of a robot, display a line connecting joint surfaces of the respective parts, and display animation for jointing the respective parts in accordance with the line connecting the joint surfaces in assembly order.

According to the present disclosure, there is proposed a program for causing a computer to function as a display control unit configured to: separately display a plurality of parts for creation of a robot, display a line connecting joint surfaces of the respective parts, and display animation for jointing the respective parts in accordance with the line connecting the joint surfaces in assembly order.

Advantageous Effects of Invention

As described above, according to the present disclosure, it is possible to improve user-friendliness of a description screen for assembly of parts in creation of a robot.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 21 is a diagram illustrating an example of a collection screen according to the embodiment.

FIG. 25 is a diagram explaining block jointing animation according to the embodiment.

FIG. 31 is a diagram illustrating an example of animation across steps according to the embodiment.

FIG. 39 is a diagram explaining a method for changing the assembly order in the preview mode according to the embodiment.

FIG. 41 is a diagram explaining a method for changing an animation start point in the preview mode according to the embodiment.

MODE(S) FOR CARRYING OUT THE INVENTION

Figure 1:
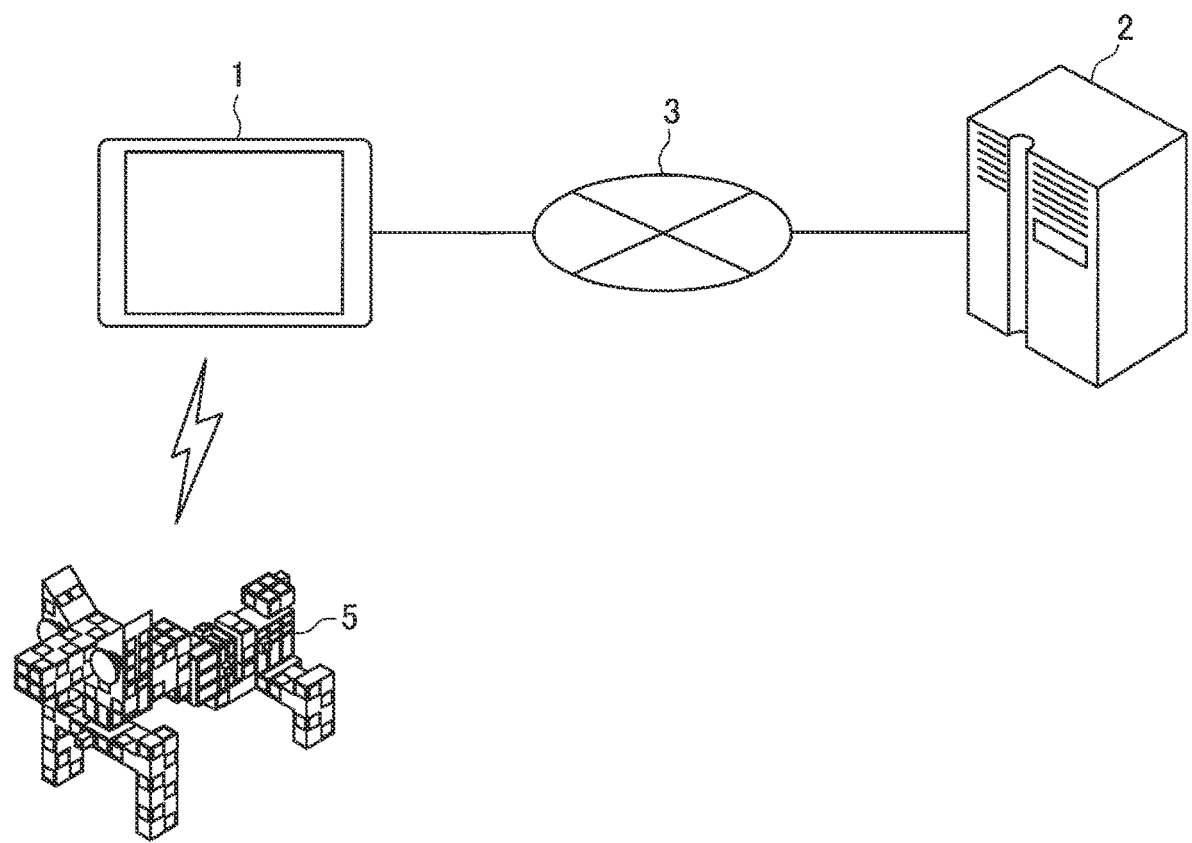
FIG. 1 is a diagram explaining outline of an information processing system according to an embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Further, description will be provided in the following order.
1. Outline of information processing system according to embodiment of present disclosure
2. Configuration
2-1. Configuration of client terminal
2-2. Configuration of server
3. Operation processing
4. Assembly description screen
5. Creation of assembly description
6. Conclusion 1. Outline of Information Processing System According to Embodiment of Present Disclosure Outline of an information processing system according to an embodiment of the present disclosure will be described with reference to FIG. 1. As illustrated in FIG. 1, the information processing system according to the present embodiment includes a client terminal 1 and a server 2. The client terminal 1 and the server 2 are connected to each other via a network 3 and transmit and receive data to and from each other. Further, the client terminal 1 can install a program in a robot 5. The robot 5 is created by a plurality of parts being assembled.

In the present embodiment, parts to be utilized for creation of a robot (constituting a robot) include electronic components such as a motor, a sensor and a cable in addiction to a block. The block is a color block made up of a number of types (for example, seven types) of polytopes or spheres having concavities and convexities to be fitted to other blocks. The block may have opaque color or may have permeability. A surface of the block can be subjected to various kinds of processing while touch by a user is taken into account. As the electronic components to be incorporated into the robot, in addition to the above-described motor, sensor and cable, a battery, a buzzer, a speaker, a display, a control unit, or the like, are assumed. As the sensor, for example, a touch sensor, a proximity sensor, an acceleration sensor, an angular velocity sensor, a geomagnetic sensor, an illuminance sensor, a temperature sensor, a pressure sensor, a biosensor (which can detect biological information of a user such as a pulse, perspiration, a brain wave, a sense of touch, a sense of smell and a sense of taste), a position detecting unit (such as a global navigation satellite system (GNSS) receiver), a camera, a microphone, or the like, are assumed.

Here, as described above, when a robot is created in accordance with description, there is a case where it is difficult only from the description and an image of an assembled completed robot to understand, for example, how concavities and convexities provided at each block are fitted.

Therefore, the present disclosure enables improvement of user-friendliness of a description screen for assembly of parts in creation of a robot using display indicating joint of parts and animation.

Configurations of the client terminal 1 and the server 2 included in the information processing system according to an embodiment of the present disclosure will be specifically described below with reference to the drawings.

2. Configuration

<2-1, Configuration of Client Terminal>

Figure 2:
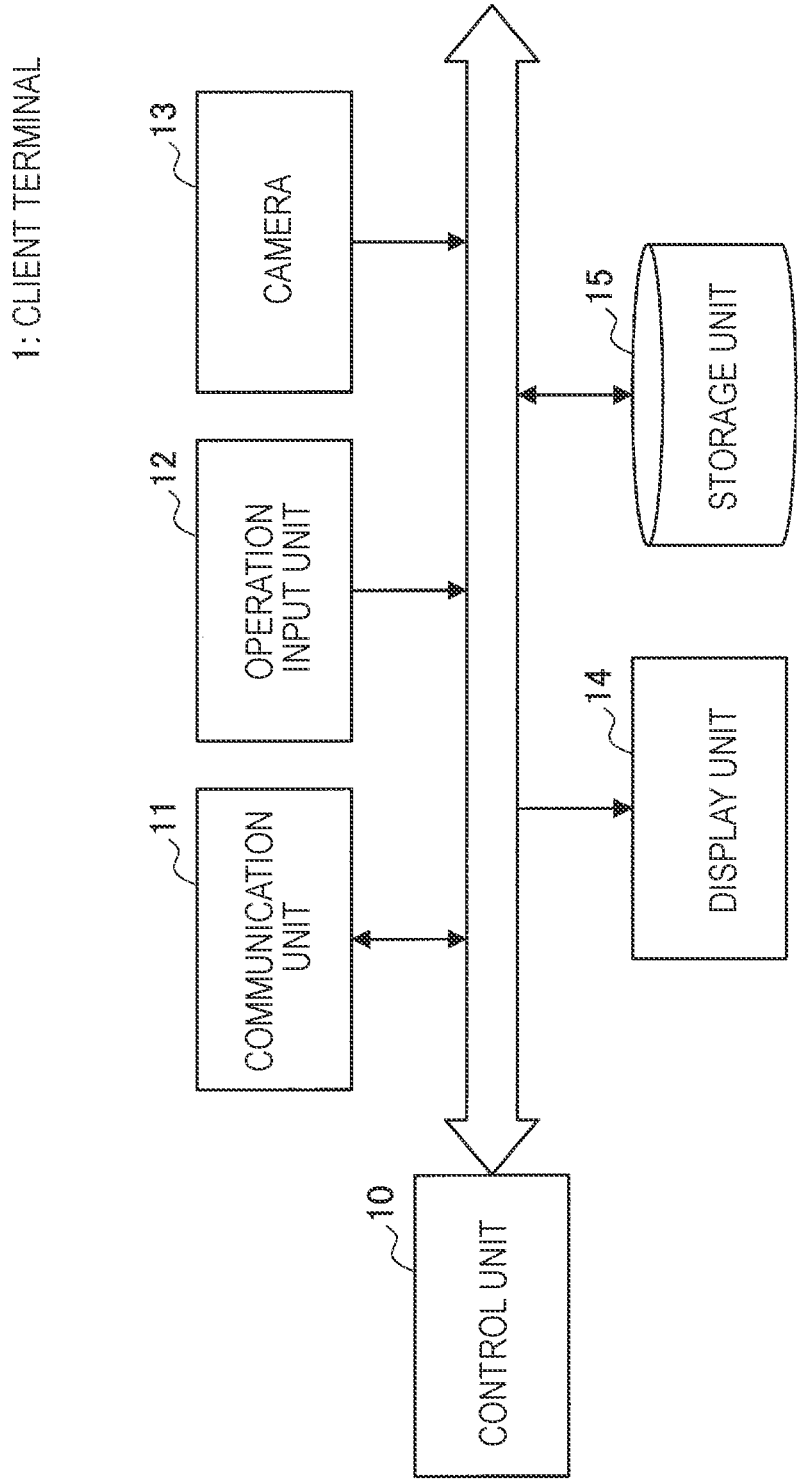
FIG. 2 is a block diagram illustrating an example of a configuration of a client terminal according to the embodiment.

FIG. 2 is a block diagram illustrating an example of the configuration of the client terminal 1 according to the present embodiment. The client terminal 1 may be a tablet terminal as illustrated in FIG. 1, or may be a smartphone, a mobile phone terminal, a notebook-size personal computer, a desktop personal computer, a head mounted display (HMD), or the like. Further, as illustrated in FIG. 2, the client terminal 1 includes a control unit 10, a communication unit 11, an operation input unit 12, a camera 13, a display unit 14 and a storage unit 15.

The control unit 10 functions as an arithmetic processing unit and a control apparatus, and controls the whole operation within the client terminal 1 in accordance with various kinds of programs. The control unit 10 is realized with electronic circuits such as, for example, a central processing unit (CPU) and a microprocessor. Further, the control unit 10 may include a read only memory (ROM) which stores programs, operation parameters, or the like, to be used, and a random access memory (RAM) which temporarily stores parameters, or the like, which change as appropriate.

The control unit 10 according to the present embodiment performs control to display various kinds of menu screens, a robot assembly screen, or the like, acquired from the server 2 at the display unit 14.

The communication unit 11 is a communication module for transmitting and receiving data to and from other apparatuses in a wired/wireless manner. The communication unit 11 performs wireless communication with external devices directly or via a network access point using a scheme such as, for example, wired local area network (LAN), wireless LAN, (registered trademark), infrared communication, Bluetooth (registered trademark) and near field communication/non-contact communication.

The communication unit 11 according to the present embodiment is, for example, connected to the server 2 via the network 3 to transmit and receive data. Further, the communication unit 11 can be also connected to the robot 5 in a wired/wireless manner to transmit and receive data.

The operation input unit 12 accepts an operation instruction from a user and outputs operation content thereof to the control unit 10. The operation input unit 12 may be a touch sensor, a pressure sensor or a proximity sensor which is provided integrally with the display unit 14. Alternatively, the operation input unit 12 may be a physical component such as a button, a switch and a lever, which is provided separately from the display unit 14.

The camera 13 includes a lens system made up of an imaging lens, a diaphragm, a zoom lens, a focus lens, or the like, a drive system for causing the lens system to perform focus operation and zoom operation, a solid-state imaging element array which performs photoelectric conversion on an image pickup light obtained at the lens system to generate an image pickup signal, or the like. The solid-state imaging element array may be realized with, for example, a charge coupled device (CCD) sensor array or a complementary metal oxide semiconductor (CMOS) sensor array.

The camera 13 according to the present embodiment, for example, acquires a captured image by capturing an image of the robot 5 created by the user.

The display unit 14 is a display apparatus which outputs various kinds of display screens such as a menu screen and a robot assembly screen. This display unit 14 may be a display apparatus such as, for example, a liquid crystal display (LCD) and an organic electroluminescence (EL) display.

The storage unit 15 stores programs and parameters to be used by the above-described control unit 10 to execute each function. Further, the storage unit 15 includes a storage apparatus including a storage medium, a recording apparatus which records data in the storage medium, a reading apparatus which reads out data from the storage medium, a deleting apparatus which deletes data recorded in the storage medium, or the like. Note that this storage unit 15 may be, for example, a non-volatile memory such as a Flash ROM (or Flash Memory), an electrically erasable programmable read-only memory (EEPROM) and an erasable programmable ROM (EPROM), a magnetic disk such as a hard drive and a disk-shaped magnetic body disk, an optical disk such as a compact disc (CD), a digital versatile disc recordable (DVD-R) and a Blu-Ray Disc (registered trademark) (BD), and a storage medium such as a magneto optical (MO) disk.

The configuration of the client terminal 1 according to the present embodiment has been described above. Note that the configuration of the client terminal 1 illustrated in FIG. 2 is an example, and the present embodiment is not limited to this. For example, the client terminal 1 may further include a microphone and a speaker.

<2-2. Configuration of Server>

Figure 3:
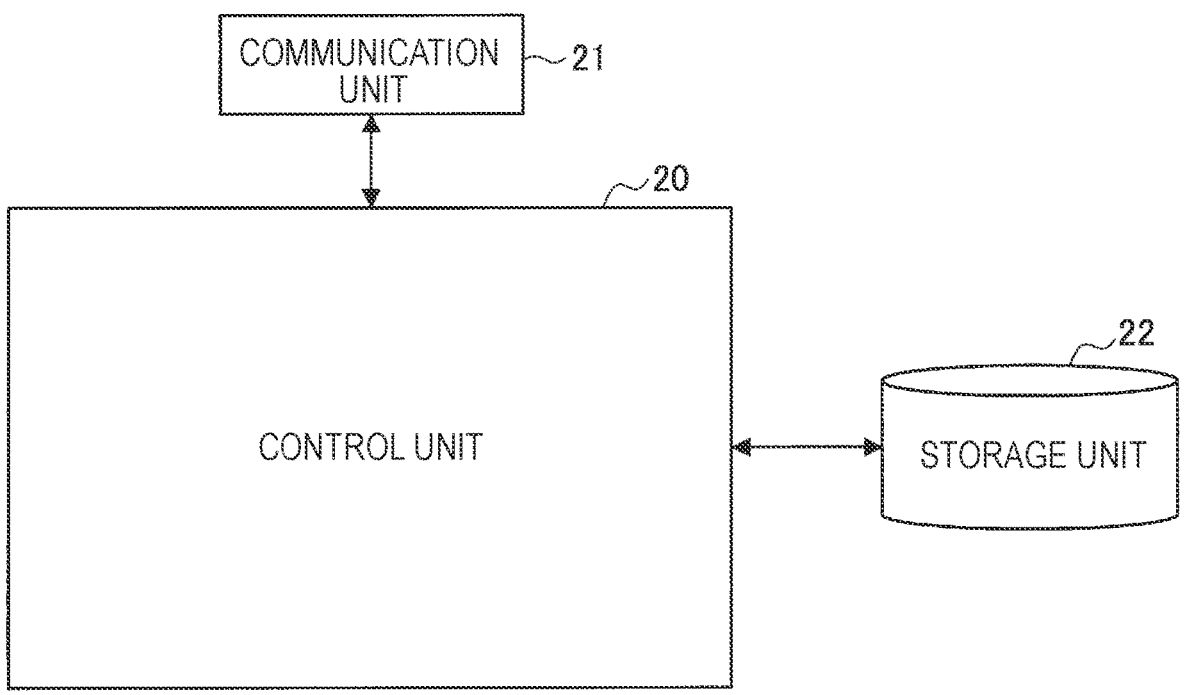
FIG. 3 is a block diagram illustrating an example of a configuration of a server according to the embodiment.

FIG. 3 is a block diagram illustrating an example of the configuration of the server 2 according to the present embodiment. As illustrated in FIG. 3, the server 2 includes a control unit 20, a communication unit 21 and a storage unit 22.

The control unit 20 functions as an arithmetic processing unit and a control apparatus and controls the whole operation within the server 2 in accordance with various kinds of programs. The control unit 20 is realized with electronic circuits such as, for example, a CPU and a microprocessor. Further, the control unit 20 may include a ROM which stores programs, operation parameters, or the like, to be used and a RAM which temporarily stores parameters, or the like, which change as appropriate.

The control unit 20 according to the present embodiment transmits display information of a menu screen to the client terminal 1 in response to a request from the client terminal 1 and performs each kind of predetermined processing in accordance with a menu selected by the user from the menu screen.

The communication unit 21 is a communication module for transmitting and receiving data to and from other apparatuses in a wired/wireless manner. The communication unit 21 according to the present embodiment is connected to the client terminal 1 via the network 3 to transmit and receive data.

The storage unit 22 stores programs and parameters to be used by the above-described control unit 10 to execute each function. Further, the storage unit 22 includes a storage apparatus including a storage medium, a recording apparatus which records data in the storage medium, a reading apparatus which reads out data from the storage medium, a deleting apparatus which deletes data recorded in the storage medium, or the like.

The storage unit 22 according to the present embodiment, for example, stores user information and robot recipe data.

The configuration of the server 2 according to the present embodiment has been described above.

3. Operation Processing

Figure 4:
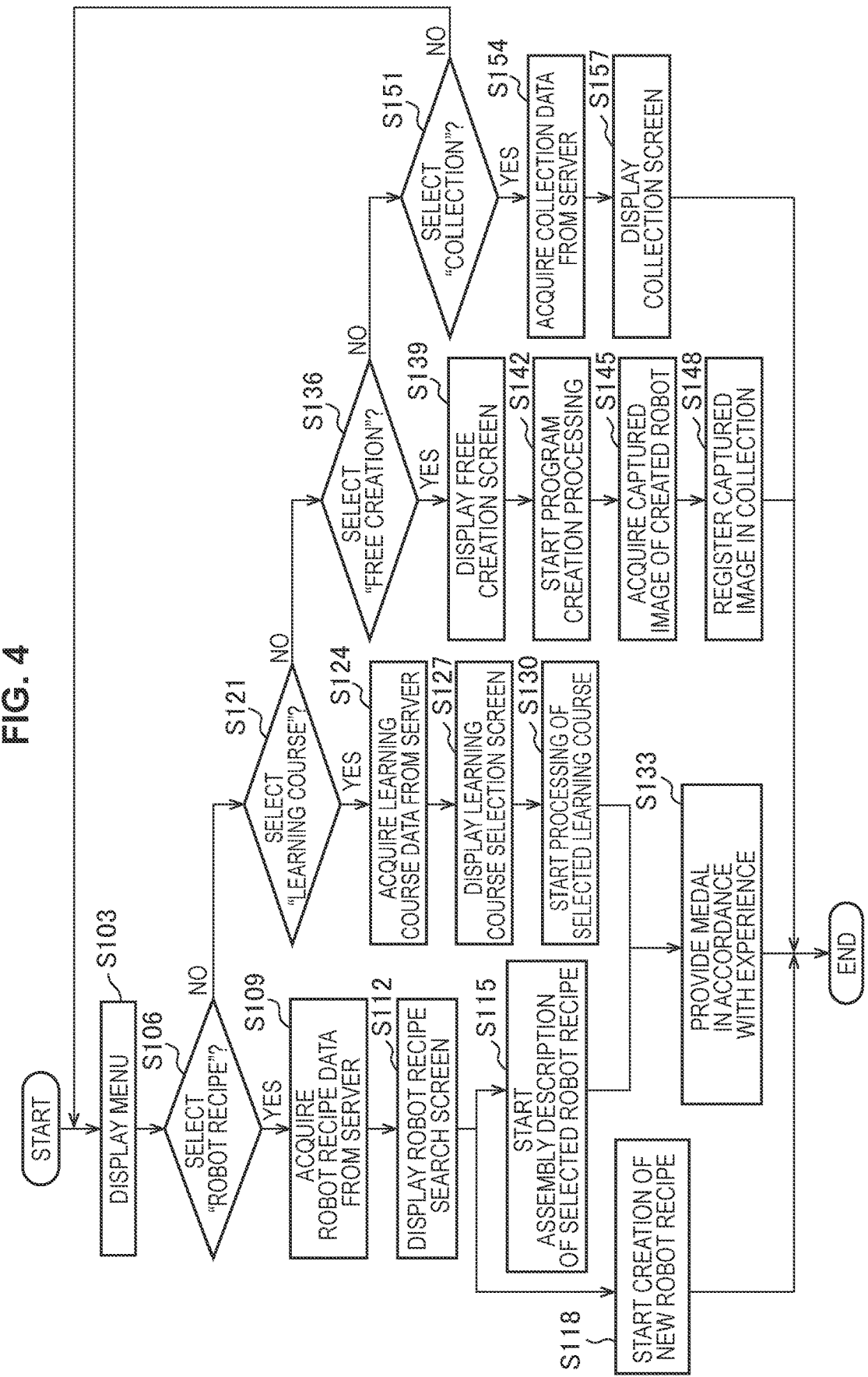
FIG. 4 is a flowchart illustrating control processing at the client terminal of the information processing system according to the embodiment.

Operation processing of the information processing system according to the present embodiment will be described next with reference to FIG. 4. FIG. 4 is a flowchart illustrating control processing at the client terminal 1 of the information processing system according to the present embodiment.

Figure 5:
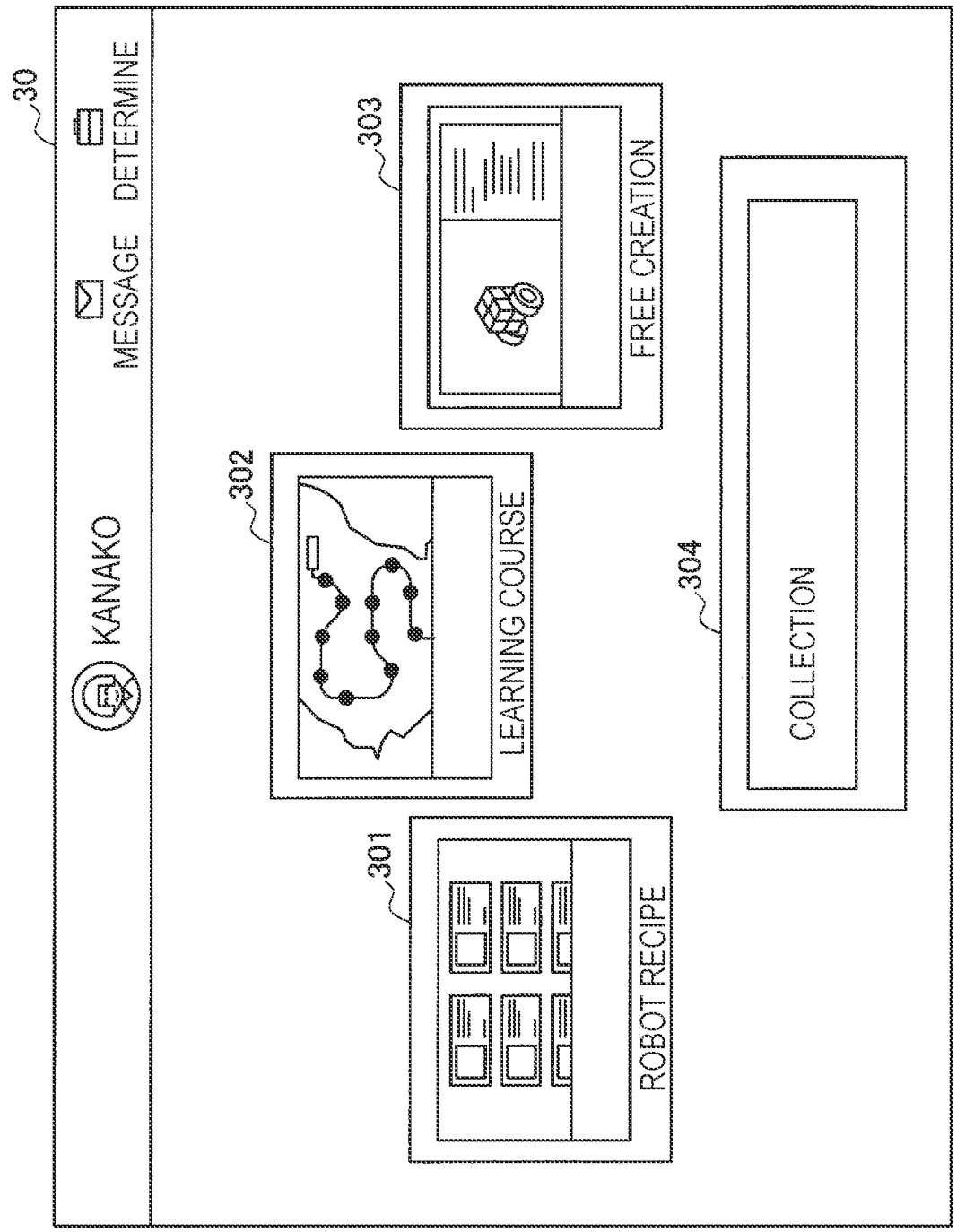
FIG. 5 is a diagram illustrating an example of a menu screen according to the embodiment.

As illustrated in FIG. 4, first, the client terminal 1 displays a menu screen at the display unit 14 on the basis of the display information received from the server 2 (step S103). Here, FIG. 5 illustrates an example of the menu screen. In the illustrated menu screen 30, menu items such as robot recipe 301, learning course 302, free creation 303 and collection 304 are displayed as an example. In the "robot recipe", a number of robot recipes are presented so as to allow the user to freely select a recipe of a robot which the user desires to create. The "learning course" allows the user to learn assembly, programming, mechanisms of various kinds of electronic components, or the like, through creation of a robot. The "free creation" allows the user to freely create a program to be installed in the robot created by the user. The "collection" allows the user to register the robot and the program created by the user along with date, a title, a commemorative photo image, or the like. Operation processing in the case where each menu item is selected will be described below.

Figure 6:
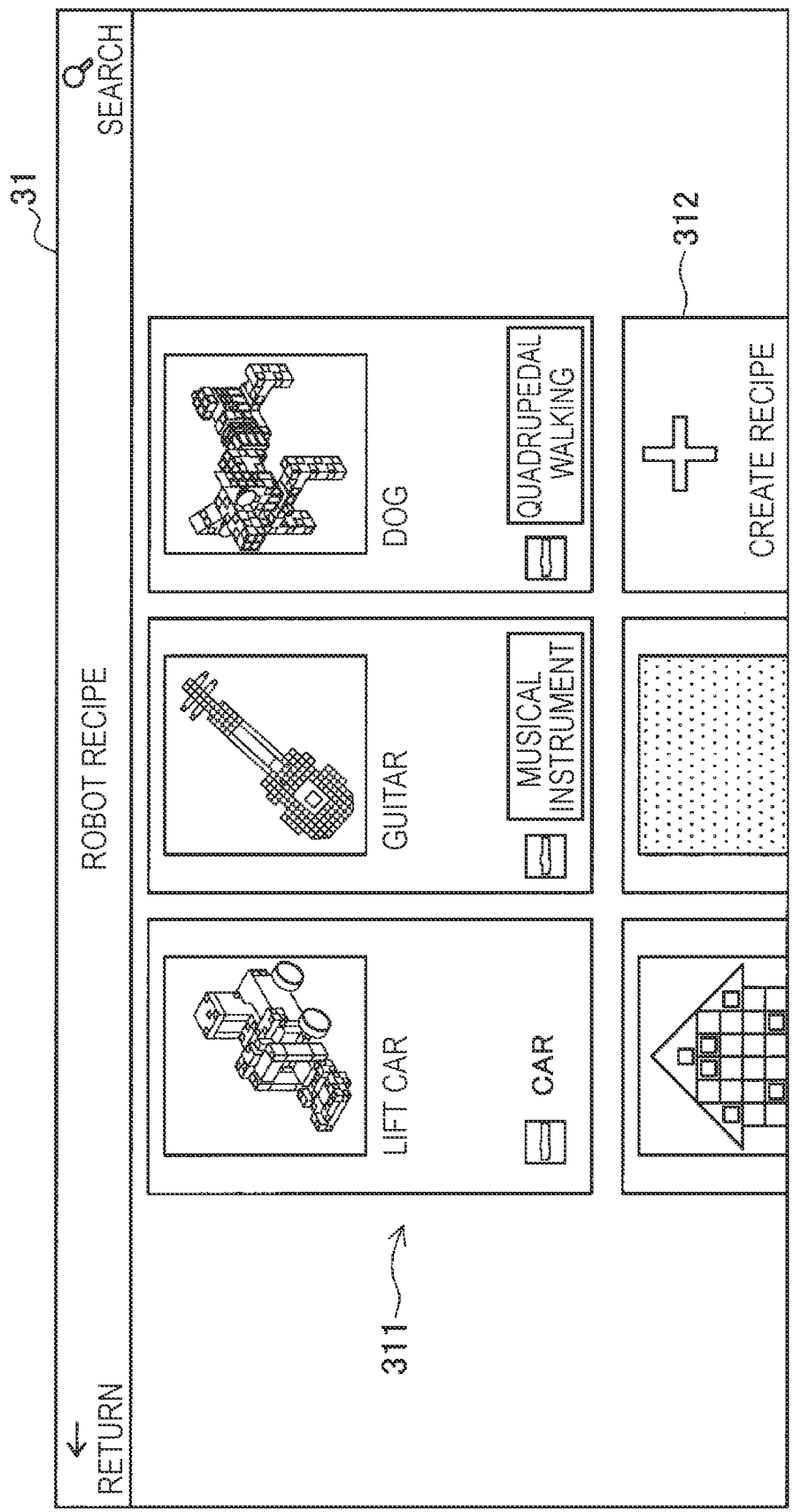
FIG. 6 is a diagram illustrating an example of a robot recipe search screen according to the embodiment.
Figure 7:
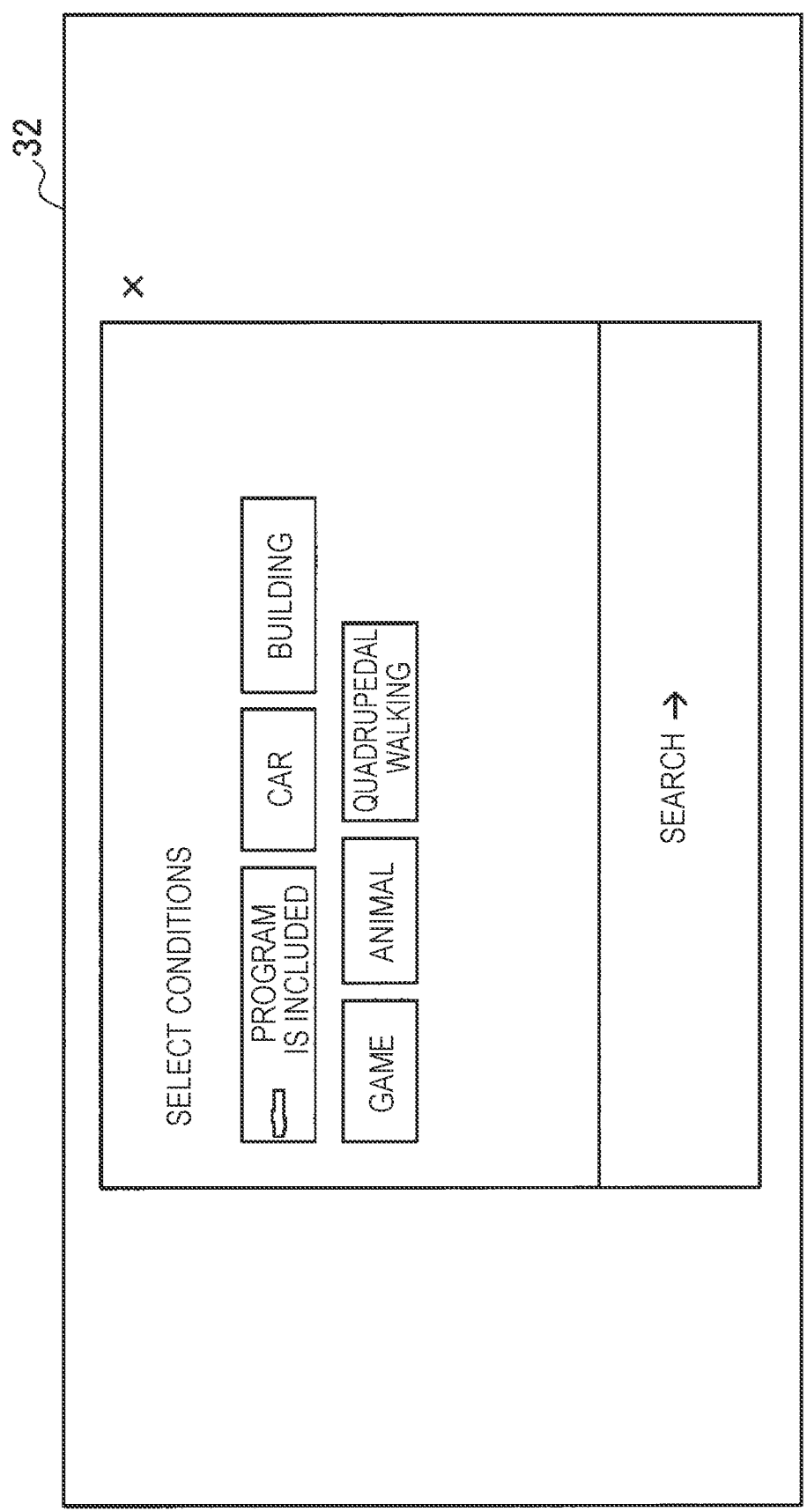
FIG. 7 is a diagram illustrating an example of a condition selection screen according to the embodiment.
Figure 8:
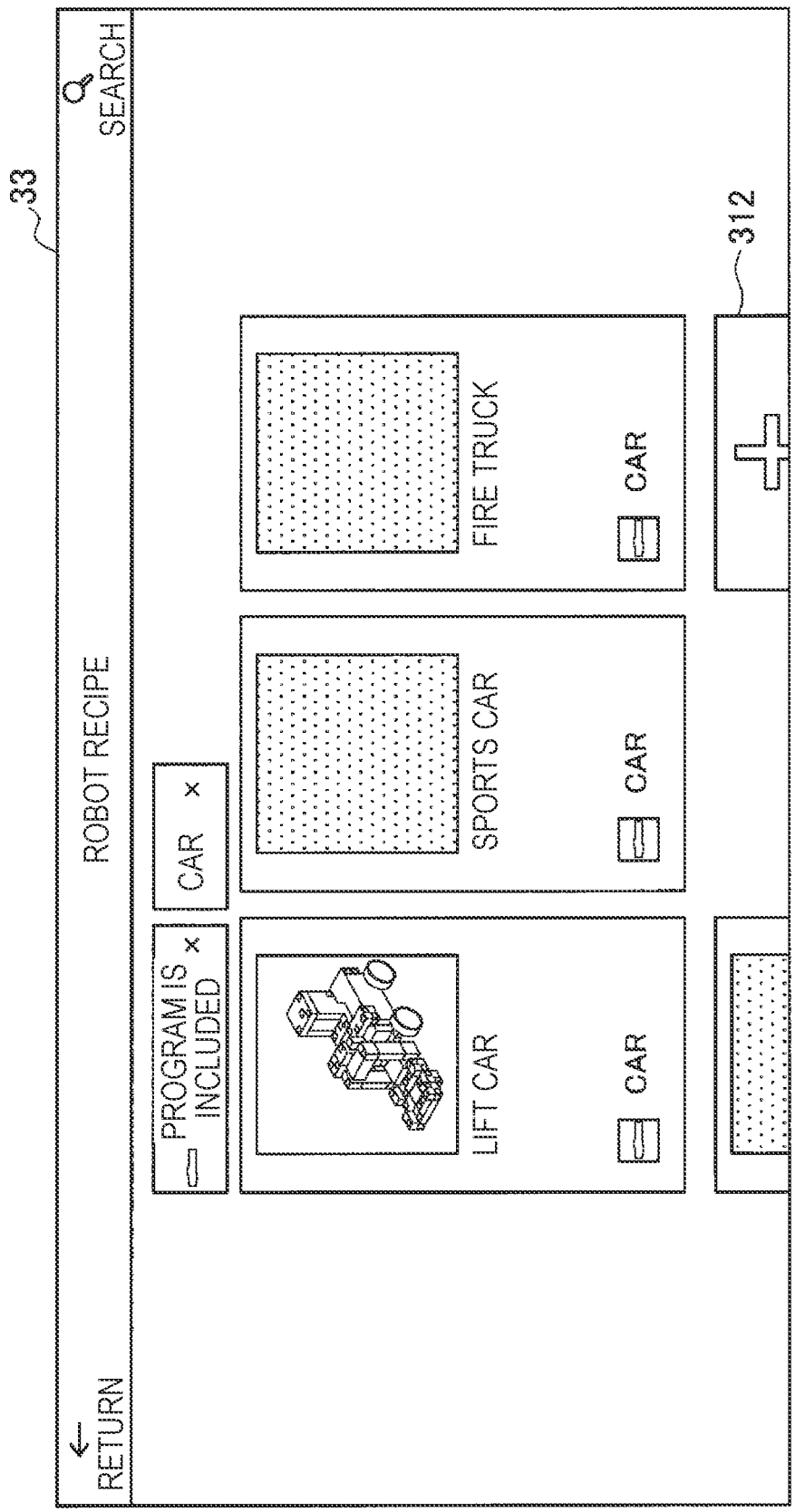
FIG. 8 is a diagram illustrating an example of a search result screen according to the embodiment.

Then, in the case where the "robot recipe" is selected (step S106: Yes), the client terminal 1 acquires robot recipe data from the server 2 (step S109), and displays a robot recipe search screen (step S112). Here, FIG. 6 illustrates an example of the robot recipe search screen. In the illustrated search screen 31, a number of pieces of robot recipe data 311 and new creation display 312 when a new recipe is generated, are displayed. The robot recipe data 311 can be narrowed down using a tagged keyword as a condition. The recipe data is searched by, for example, a magnifying glass icon illustrated in an upper right portion of the search screen 31 being tapped. Here, FIG. 7 illustrates an example of a condition selection screen. The illustrated condition selection screen 32 is displayed when the magnifying glass icon illustrated in the upper right portion of the search screen 31 being tapped. When the user selects a condition from a plurality of keywords displayed on the condition selection screen 32 and taps "search", a search result of recipes with which the selected keyword is tagged is displayed. For example, in the case where "program is included" and "car" are selected as conditions, a search result screen 33 as illustrated in FIG. 8 is displayed. In the illustrated search result screen 33, robot recipe data in which "program is included" and concerning "car" is displayed. Note that the new creation display 312 may be also displayed on the search result screen 33.

Figure 9:
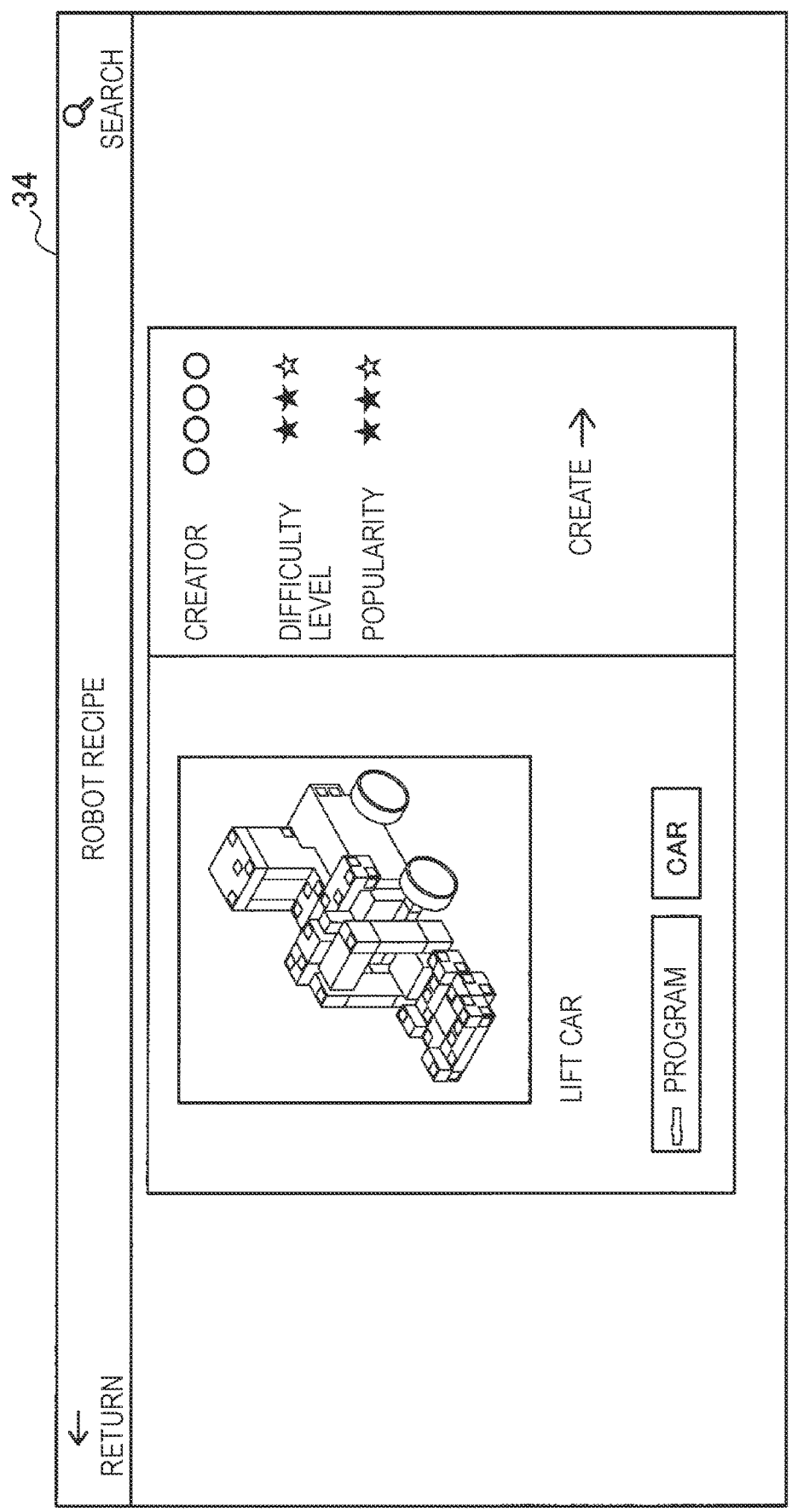
FIG. 9 is a diagram illustrating an example of a detailed information display screen of robot recipe data according to the embodiment.

The user taps the robot recipe data which the user desires to create and browses detailed information. Here, FIG. 9 illustrates an example of a detailed information display screen of the robot recipe data. In the illustrated detailed information display screen 34, information such as an image of a completed robot, a title, a creator, a difficulty level and popularity is displayed. While not illustrated in FIG. 9, in the case where information of parts possessed by the user is obtained, it is also possible to display whether or not the robot can be created with the parts possessed by the user, or, in the case where the parts are insufficient, which parts are lacking along with the information. In the case where the robot to be created is determined, the user taps a region where "create" is displayed and makes a final decision on selection of the robot recipe.

Then, the client terminal 1 starts assembly description of the selected robot recipe (step S115) Specifically, the client terminal 1 receives recipe data including robot assembly information, or the like, from the server 2 and displays an assembly description screen at the display unit 14. Specific examples of the assembly description screen will be described later with reference to FIG. 23 to FIG. 31.

Further, in the case where new creation of robot recipe is selected, the client terminal 1 starts creation of new robot recipe (step S118). Detailed content of the creation of new robot recipe will be described later.

Figure 10:
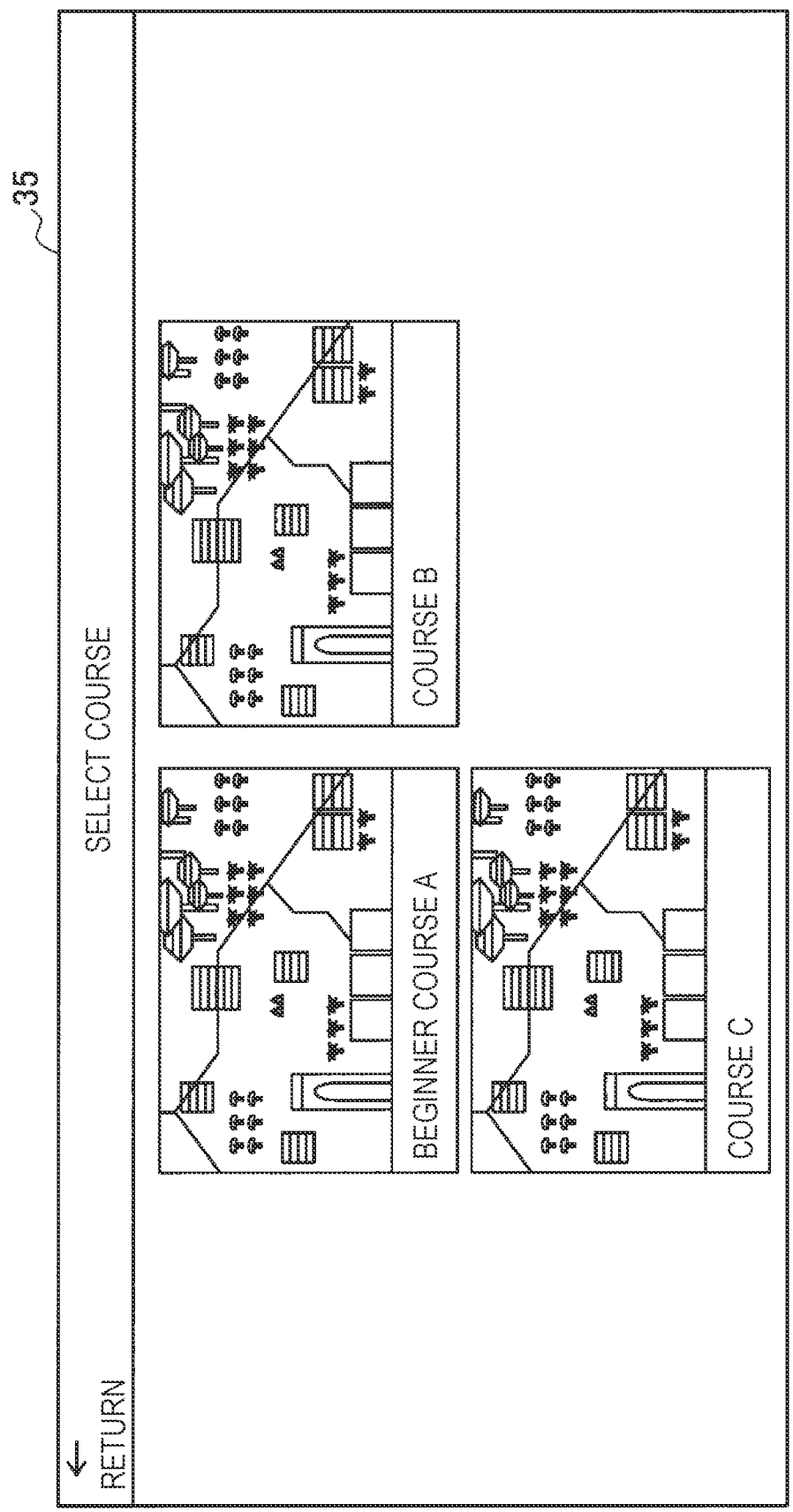
FIG. 10 is a diagram illustrating an example of a learning course selection screen according to the embodiment.

Meanwhile, in the case where the "learning course" is selected (step S121: Yes), the client terminal 1 acquires learning course data from the server 2 (step S124) and displays a learning course selection screen (step S127). Here, FIG. 10 illustrates an example of the learning course selection screen. In the illustrated learning course selection screen 35, a plurality of learning courses such as, for example, "beginner course B" and "course C" is presented. The user selects an arbitrary course.

Figure 11:
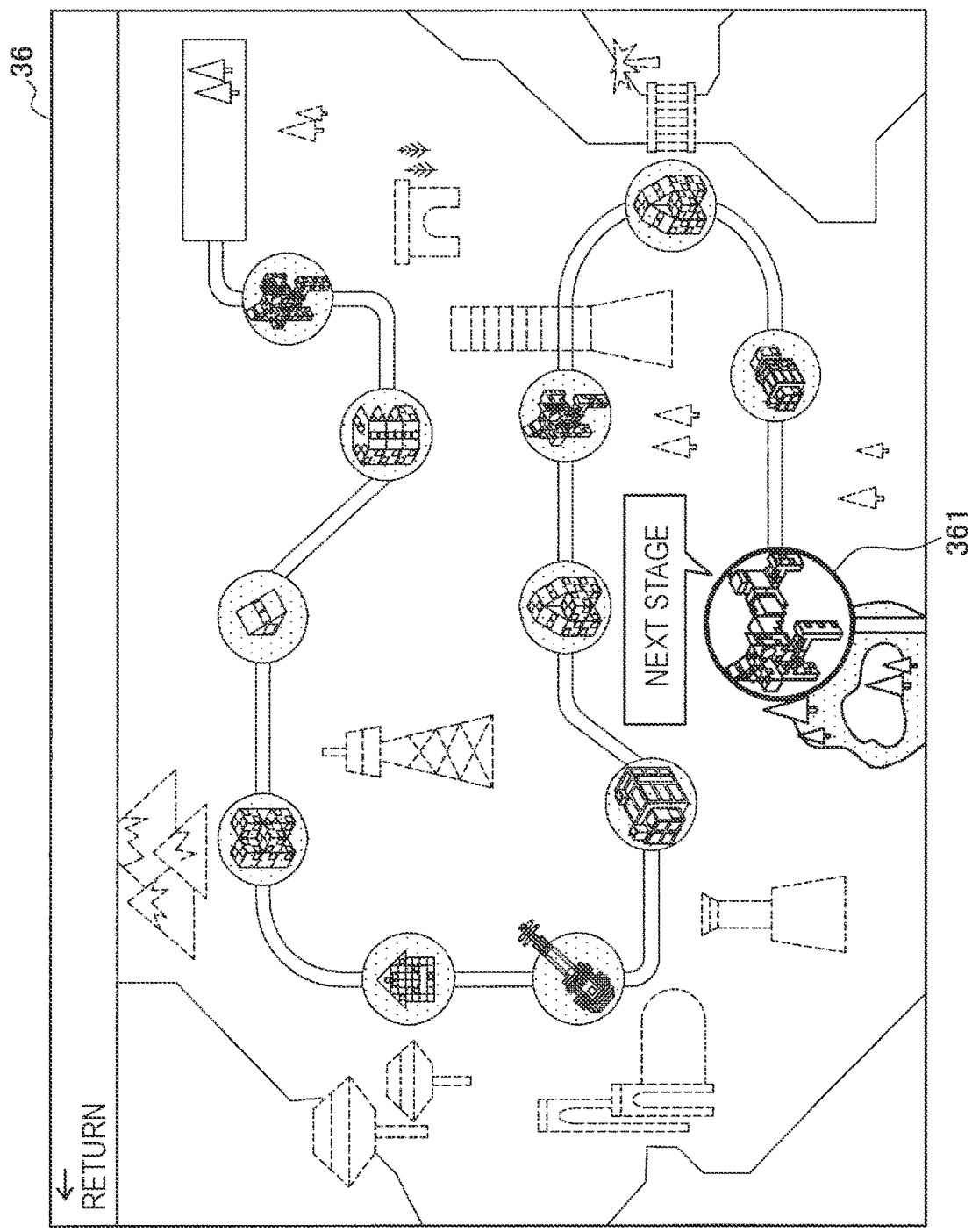
FIG. 11 is a diagram illustrating an example of a learning course screen according to the embodiment.
Figure 12:
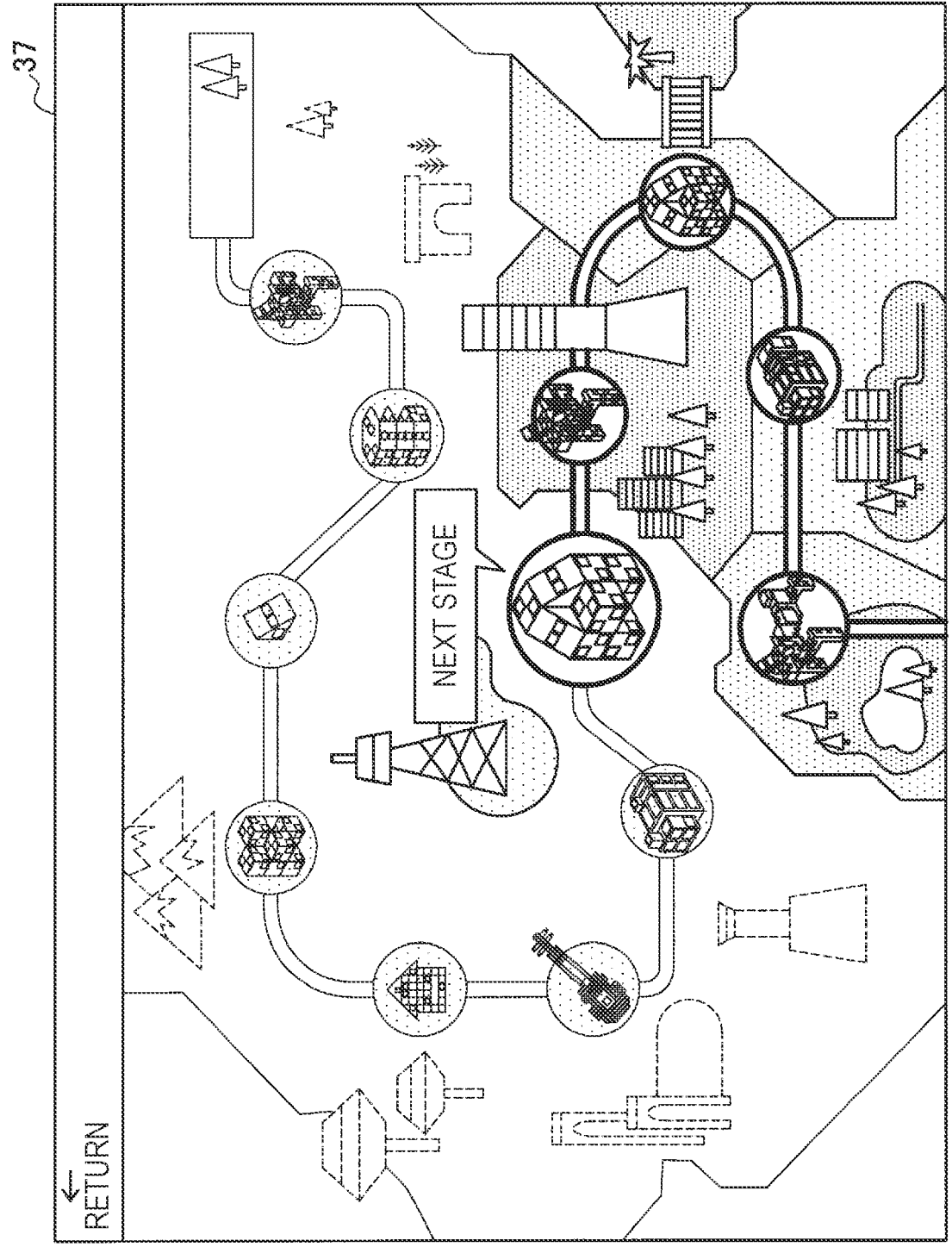
FIG. 12 is a diagram illustrating an example of the learning course screen according to the embodiment.
Figure 13:
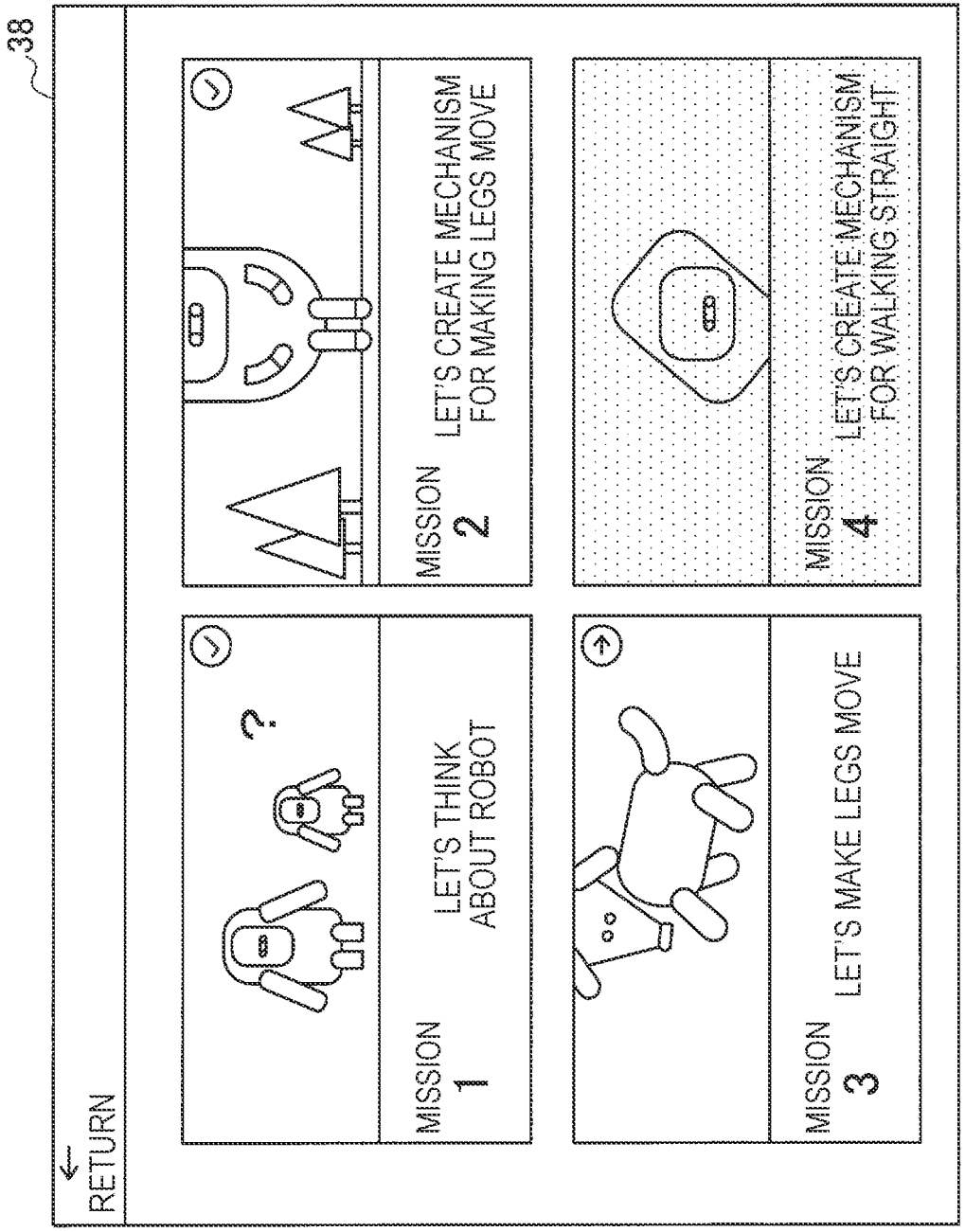
FIG. 13 is a diagram illustrating an example of a mission screen according to the embodiment.

Then, the client terminal 1 starts processing of the learning course selected by the user (step S130). Here, FIG. 11 and FIG. 12 illustrate an example of the learning course screen. As illustrated in FIG. 11 and FIG. 12, the learning course includes a plurality of stages, and display is controlled so that, for example, a town is gradually completed as a stage proceeds. If the user taps and selects an icon 361 of a stage, for example, a mission screen 38 as illustrated in FIG. 13 is displayed. In the mission screen 38, a plurality of missions provided for learning content to be learned in the present stage in a stepwise manner is presented. If a mission is accomplished, a check mark is displayed, and an arrow mark is displayed at a mission to be learned next. Further, missions ahead are displayed in a grayed out state.

Figure 14:
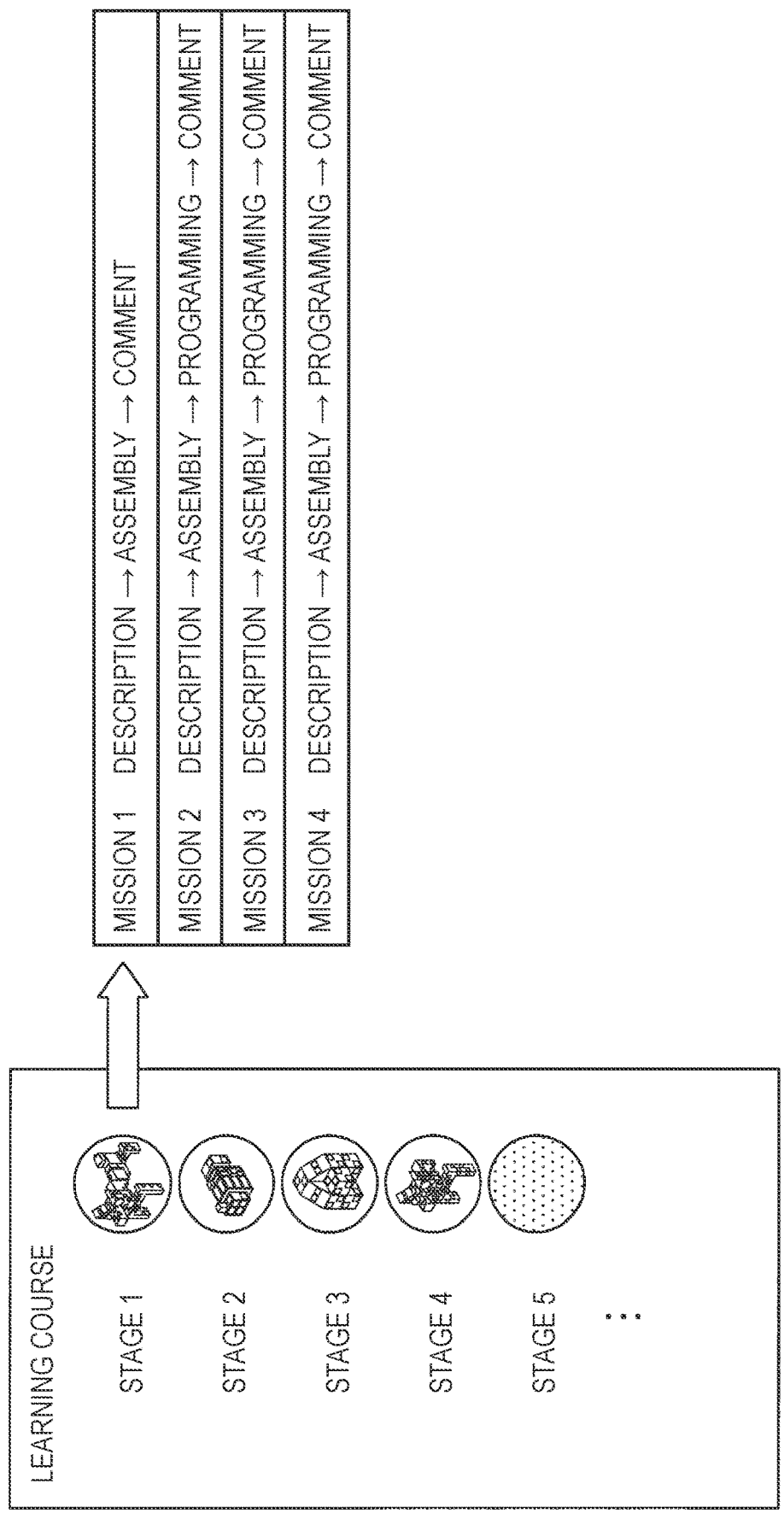
FIG. 14 is a diagram explaining each stage and missions of a learning course according to the embodiment.
Figure 15:
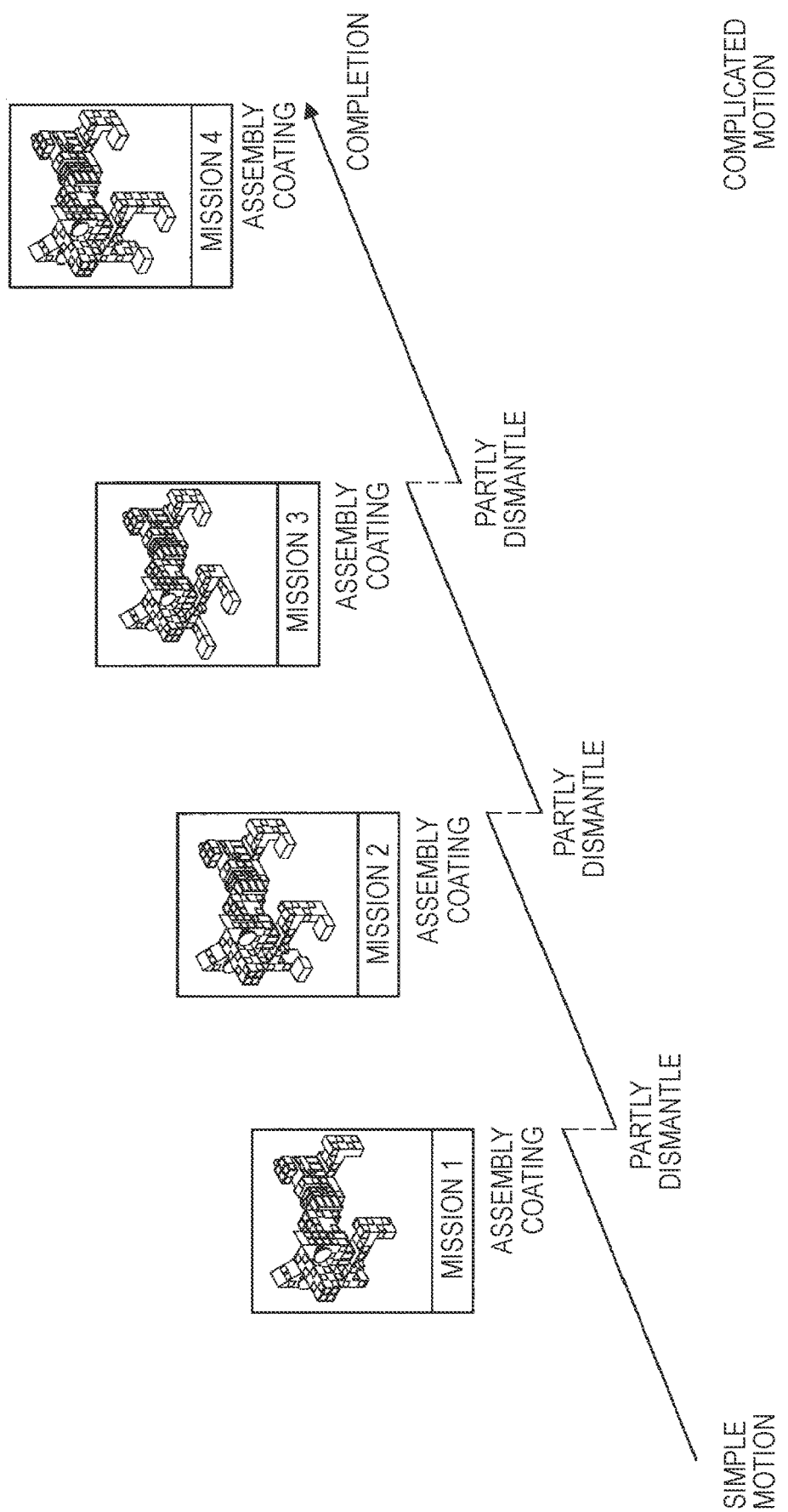
FIG. 15 is a diagram explaining each mission according to the embodiment.

Here, the learning course, each stage and missions according to the present embodiment will be described with reference to FIG. 14. As illustrated in FIG. 14, for example, one learning course includes a plurality of stages, and the user learns a mechanism of a robot, or the like, while creating a predetermined robot in each stage. Further, as illustrated in FIG. 14, one stage includes a plurality of missions. Each mission is provided to make the user understand learning content of the present stage in a stepwise manner. For example, in mission 1, description of motion of the robot, actual assembly of the robot and comment including review is provided. Further, in the next mission 2, description of motion of the robot, actual assembly of the robot, creation of a program which makes the robot operate and comment including review is provided. Each mission will be described with reference to FIG. 15. As illustrated in FIG. 15, for example, in mission 1, the user learns elementary content by performing simple assembly, and, then, a difficulty level of learning is increased by making the user dismantle part of the assembled robot and perform a little more complicated assembly next. Further, a difficulty level of programming (coding) is increased in accordance with increase of the difficulty level of assembly. In this manner, in each mission, the user can grow up in a stepwise manner by difficulty levels of assembly of the robot and programming being gradually increased.

Note that each stage of the learning course and content and a difficulty level of missions in the stage may be flexibly changed in accordance with a learning level of the user. The client terminal 1 (or the server 2) can judge the learning level of the user in accordance with a learning progress state of the user (such as learning time, quizzes as necessary, learning history and robot creation experience history) and change content or a difficulty level of the next mission or the next stage.

Then, the client terminal 1 provides a predetermined medal in accordance with robot creation and experience of the learning course by the user (step S133). In the present embodiment, as proof of growth, it is possible to provide various kinds of medals as proof of growth experience through creation of the robot recipe and each stage of the learning course, for example, when the user has learned a new program, when the user has noticed a mechanism of an object which the user did not know, when the user has experienced something for the first time, or when the user has achieved something.

As a case where the user has learned a new program, for example, a case is assumed where the user has created a robot and learned using the following programs.

Figure 16:
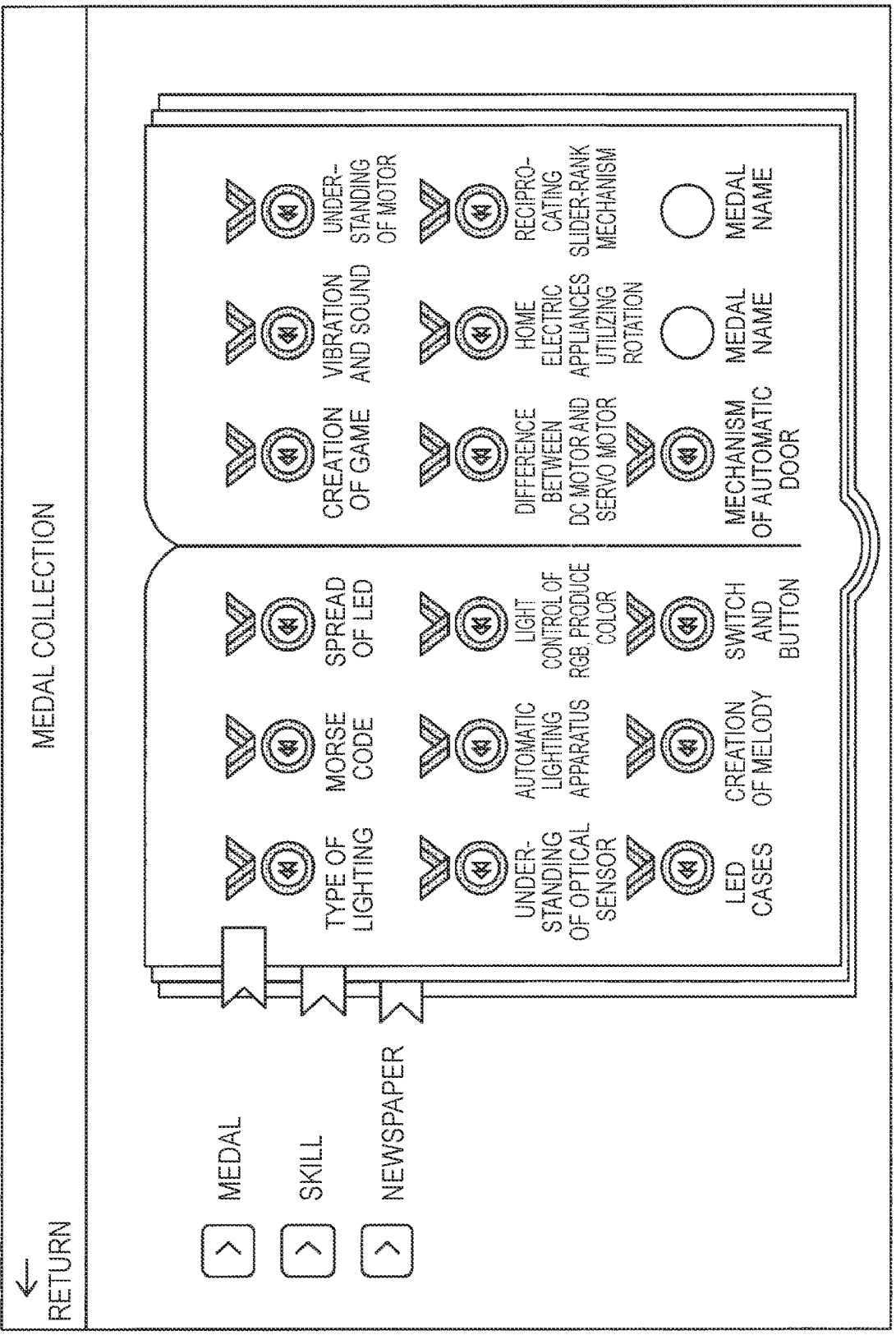
FIG. 16 is a diagram illustrating an example of a medal collection screen according to the embodiment.

Scratch language
sequential processing
repetition (loop circuit)
pulse width modulation (PWN)
acquisition of sensor values (an optical sensor, a touch sensor, a photoreflector, an acceleration sensor)
conditional branch
usage of a test mode
control of a button
utilization of a timer, timer control
program of sound
random number and random control
write and a live mode
motor control (a DC motor, a servo motor)
execution of different kinds of control at the same time
OR
priority order
utilization of an acceleration sensor (second time, how to use XYZ axes)
variable Further, as a case where the user has newly noticed a mechanism of an object, for example, the following mechanisms and viewpoints are assumed.

types of lighting (fire, candescence, fluorescence, LED)
a Morse code
spread of an LED
understanding of an optical sensor
an automatic lighting apparatus
light control of RGB, produce color
LED cases
creation of melody
a switch and a button
vibration and sound, a speaker and ears
create a virtual game
bend and stretch
a difference between a DC motor and a servo motor
home electric appliances utilizing rotation
a reciprocating slider-crank mechanism
understanding of a photoreflector
a mechanism of an automatic door
care for safety
an automatic door
a mechanism of a toilet
a difference between wheels and legs
understanding of a servo motor Here, FIG. 16 illustrates an example of a medal collection screen. In the illustrated medal collection screen 39, medals provided to the user are displayed. The respective medals are listed along with display of experience content.

Figure 17:
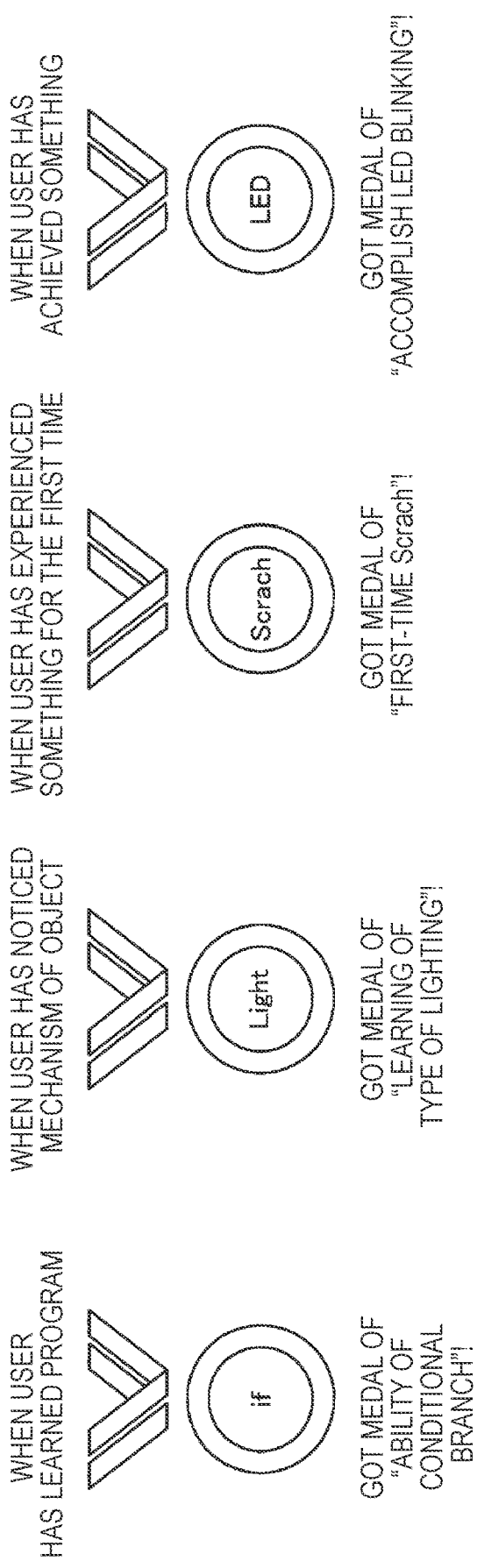
FIG. 17 is a diagram illustrating an example of a type of a medal provided in accordance with growth experience according to the embodiment.
Figure 18:
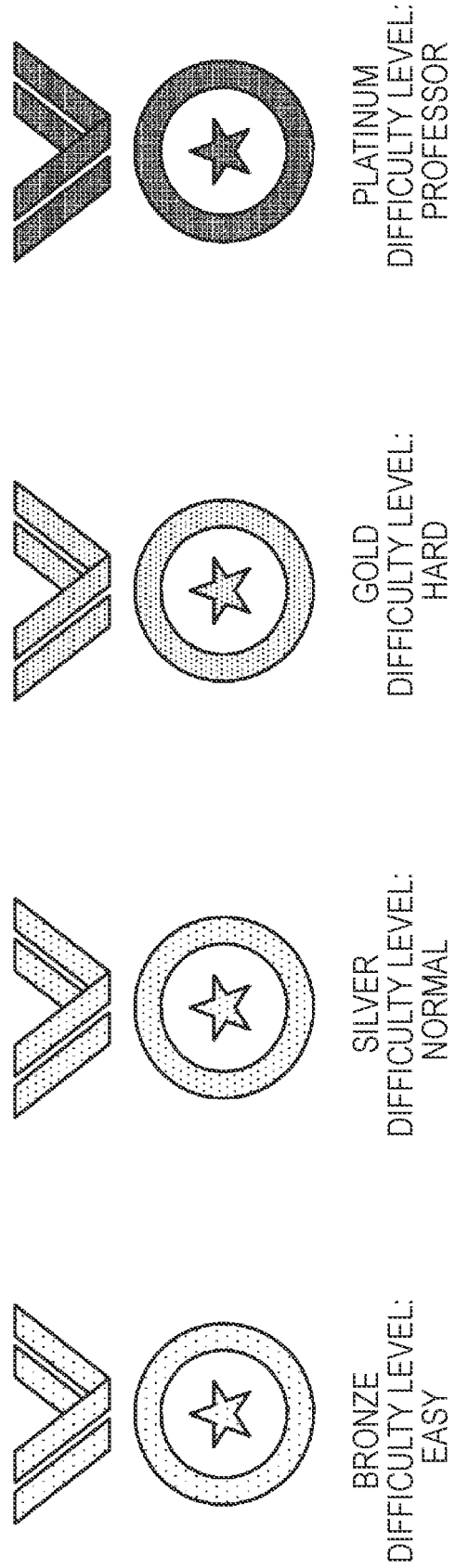
FIG. 18 is a diagram illustrating an example of a medal level which changes in accordance with a difficulty level of experience according to the embodiment.

Further, an example of various kinds of medals to be provided to the user is illustrated in FIG. 17 and FIG. 18. FIG. 17 is a diagram illustrating an example of types of medals to be provided in accordance with growth experience. As illustrated in FIG. 17, for example, a medal in which a keyword indicating growth experience is described can be provided. FIG. 18 is a diagram illustrating an example of medal levels which change in accordance with a difficulty level of experience. As illustrated in FIG. 18, medals of different colors such as bronze, silver, gold and platinum can be provided in accordance with the difficulty level of experience.

Note that, while medals provided as proof of growth are described here, the client terminal 1 may further generate and display skill collection from which content of skills which are newly acquired by the user can be confirmed again, and newspaper collection which indicates episode regarding the created robot in a newspaper form.

Figure 19:
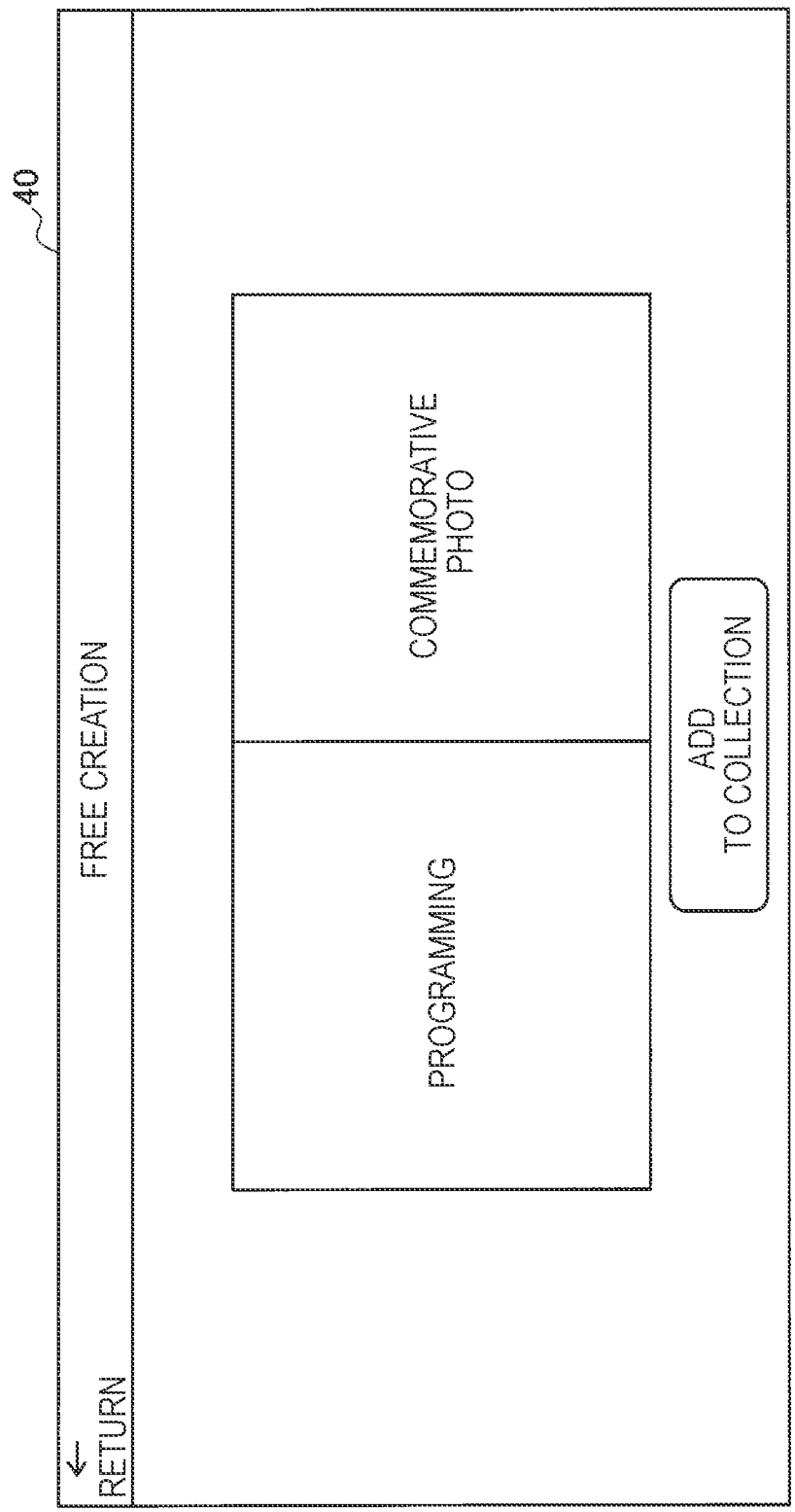
FIG. 19 is a diagram illustrating an example of a free creation screen according to the embodiment.

Then, in the case where the "free creation" is selected in the menu screen 30 (step S136: Yes), the client terminal 1 displays a free creation screen at the display unit 14 on the basis of the screen display information acquired from the server 2 (step S139) and starts program creation processing (step S142). Here, FIG. 19 illustrates an example of the free creation screen. In the illustrated free creation screen 40, display of "programming" for creating a program, display of "commemorative photo" for registering a photo of the created robot, and an "add to collection" button for adding the created program and the photo of the robot as collection, are displayed.

Figure 20:
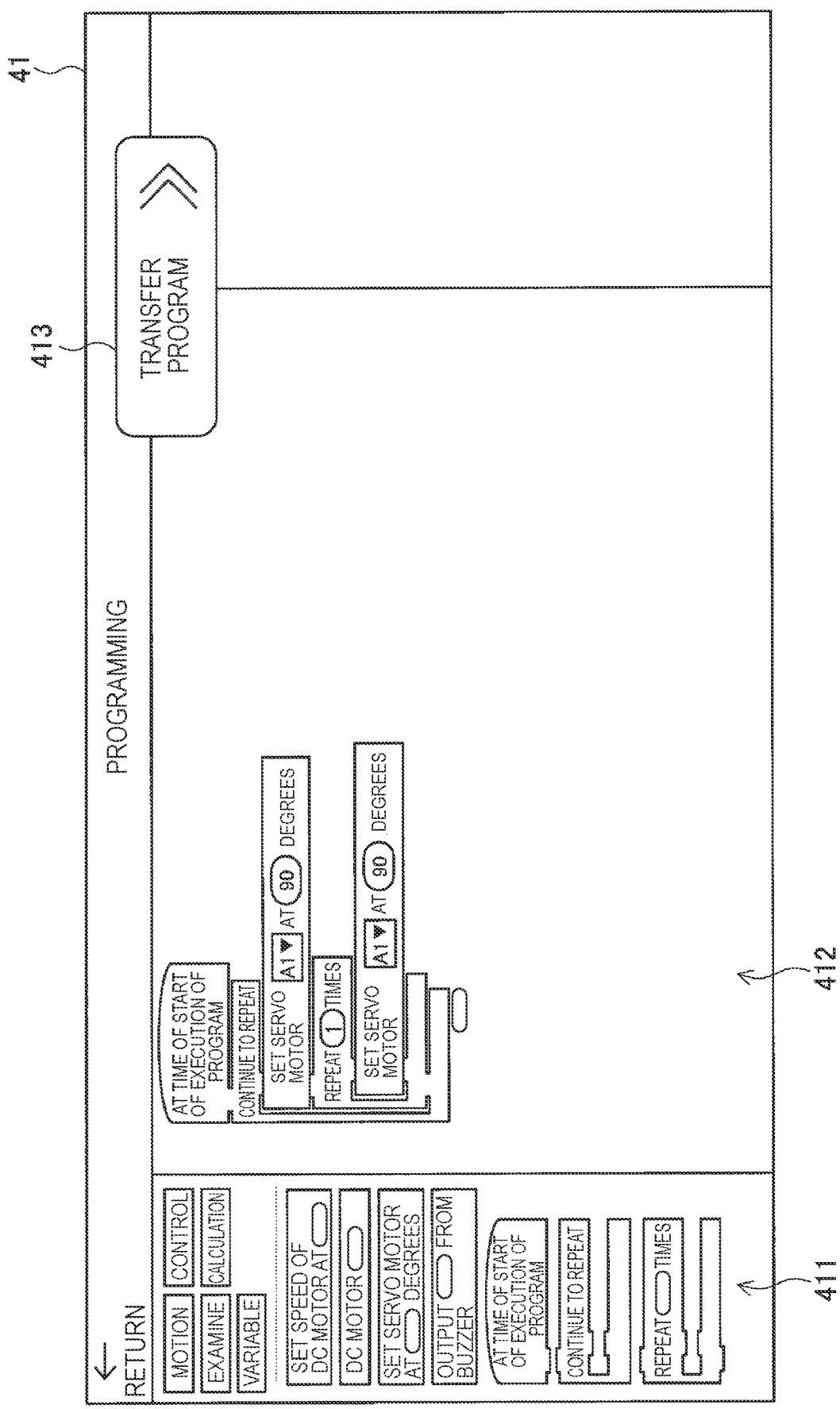
FIG. 20 is a diagram illustrating an example of a program creation screen according to the embodiment.

If the display of "programming" is tapped, a program creation screen is displayed. Here, FIG. 20 illustrates an example of the program creation screen. In the illustrated program creation screen 41, a display screen 411 for a module which visually indicates programming language, and a work region 412 for creating a program are displayed. The user can construct a program by dragging and moving a module from the display screen 411 to the work region 412. Further, the user can arbitrarily set a numerical value within the module. Then, if the user taps a program transfer button 413, the program constructed in the work region 412 is transmitted to the robot 5, and it is possible to make the robot 5 operate.

Then, if the display of "commemorative photo" in the free creation screen 40 in FIG. 19 is tapped, the client terminal 1 accepts uploading of a captured image of the created robot and acquires the captured image (step S145). The captured image of the robot may be, for example, acquired by a camera of the client terminal 1.

Then, if the "add to collection" button in the free creation screen 40 in FIG. 19 is tapped, the client terminal 1 registers the created program and the uploaded captured image as collection of the user (step S148). Specifically, for example, the client terminal 1 transmits the created program and the captured image to the server 2 and performs control so that the created program and the captured image are stored as collection of the user.

Figure 21:
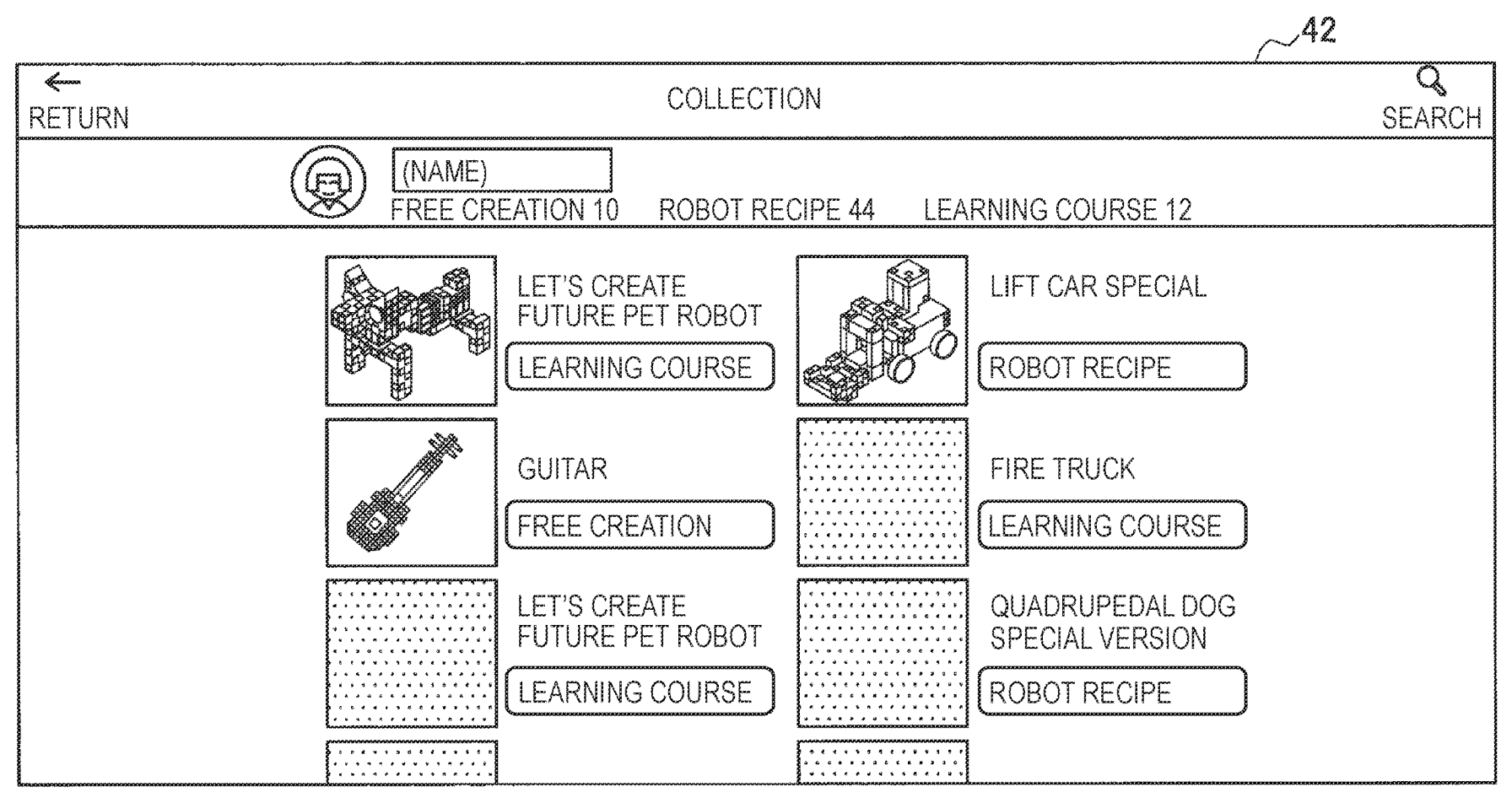

Subsequently, in the case where the "collection" is selected in the menu screen 30 (step S151: Yes), the client terminal 1 acquires collection data of the user from the server 2 (step S154) and displays a collection screen at the display unit 14 (step S157). Here, FIG. 21 illustrates an example of the collection screen. In the illustrated collection screen 42, a list of robots created by the user is displayed. Specifically, the collection screen 42 includes display of the captured image and a title of the created robot, and display indicating through which of the learning course, free creation or the robot recipe, the robot is created.

The control processing of the client terminal 1 according to the present embodiment has been specifically described above. Subsequently, an assembly description screen displayed at the client terminal 1 when a robot is assembled through the above-described robot recipe or learning course will be specifically described using FIG. 22 to FIG. 31.

4. Assembly Description Screen

Figure 22:
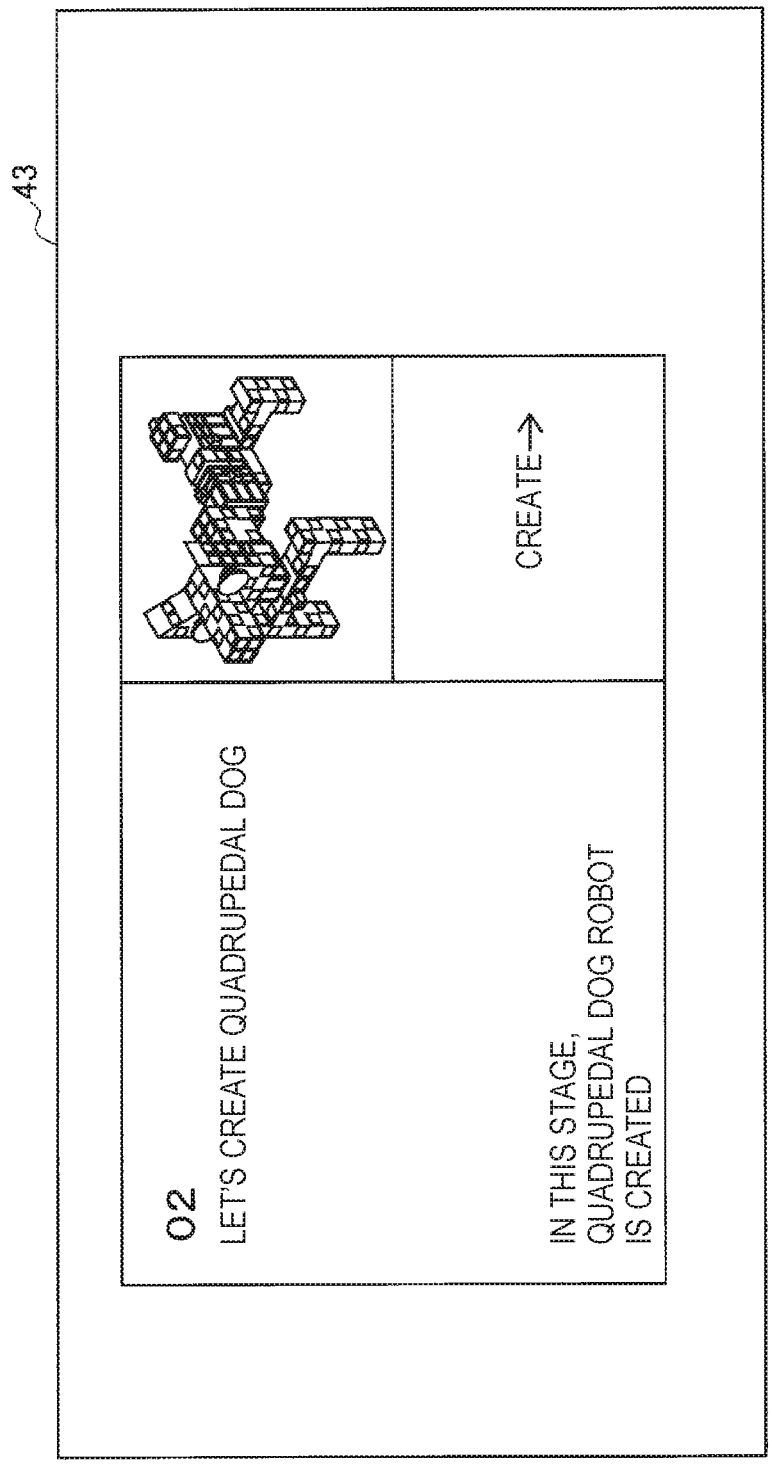
FIG. 22 is a diagram illustrating an example of a start screen of robot assembly description according to the embodiment.

FIG. 22 is a diagram illustrating an example of a start screen of robot assembly description. The illustrated start screen 43 is displayed, for example, when a certain stage of the teaming course is selected. In the start screen 43, description regarding content of the stage, an image of the completed robot, and display of "create" are displayed. If the user taps the display of "create", description regarding actual assembly is started.

Figure 23:
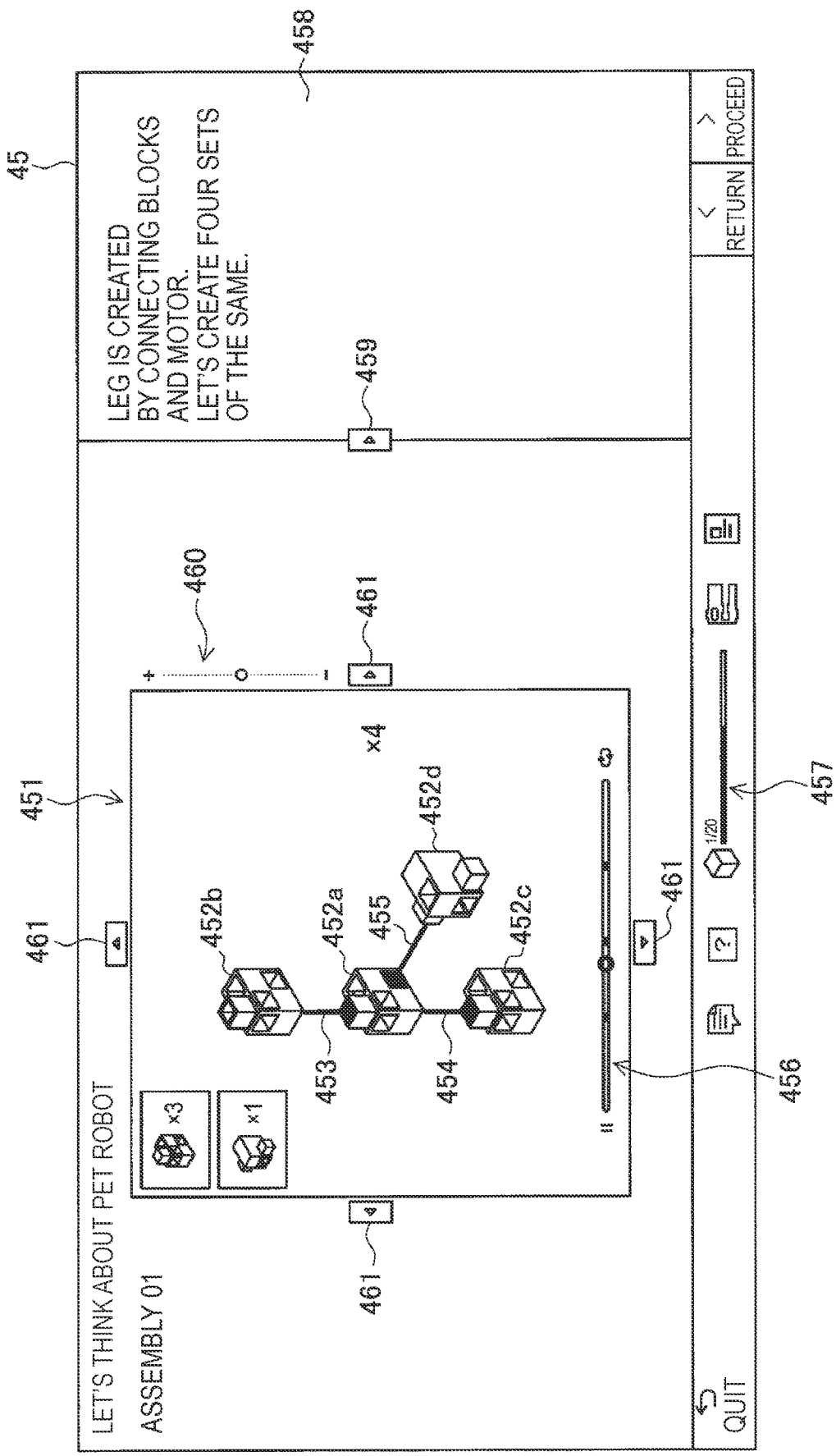
FIG. 23 is a diagram illustrating an example of an assembly description screen according to the embodiment.

FIG. 23 is a diagram illustrating an example of the assembly description screen. The illustrated assembly description screen 45 is a screen describing assembly of parts, and includes a drawing region 451 and a caption region 458. Display and non-display of the caption region 458 is controlled with a caption opening/closing button 459.

It is possible to scale the drawing region 451 and move a viewpoint. The user can scale the viewpoint through, for example, pinch-in/pinch-out operation, manipulation of a scaling control bar 460 or mouse wheel manipulation, or can move the viewpoint centering around a base point through drag and drop or touch and swipe operation. Further, it is also possible to move the viewpoint upward, downward, rightward and leftward by direction buttons 461 provided above, below, on a right side and on a left side of the drawing region 451 being depressed and move the viewpoint upward, downward, rightward or leftward through drag and drop operation while a Shift key being depressed.

Note that the viewpoint may be automatically moved as part of assembly animation. For example, during jointing animation, the viewpoint may be moved to an angle at which a concavity and a convexity of joint portions of blocks can be seen.

Figure 24:
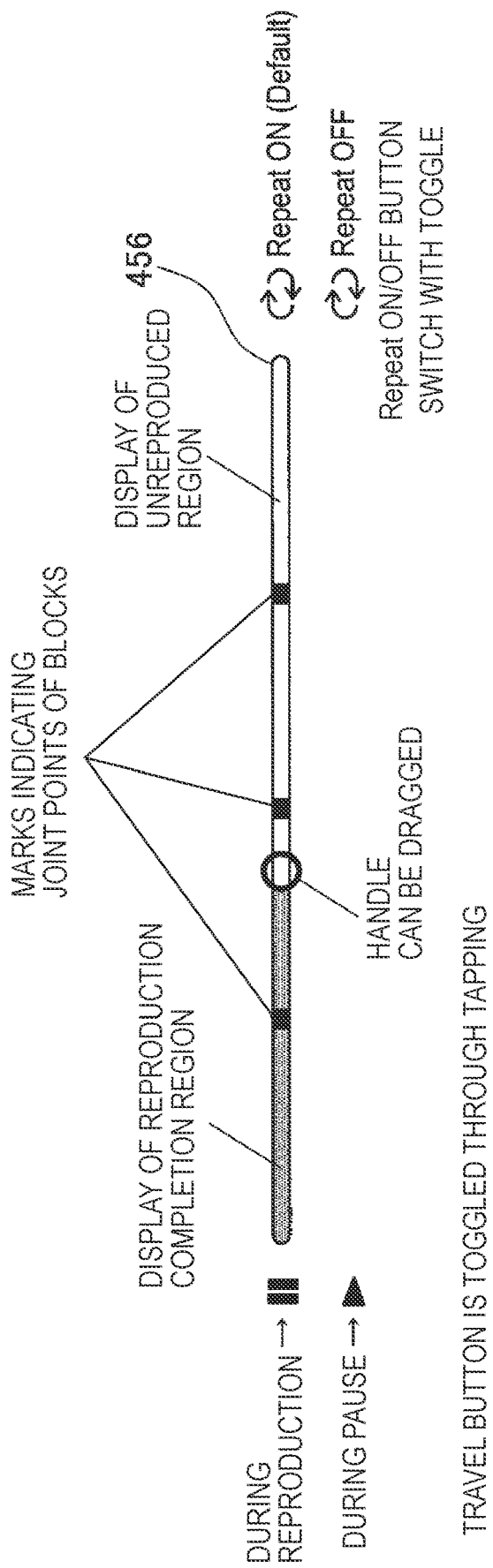
FIG. 24 is a diagram explaining details of an animation progress bar according to the embodiment.

Further, in the drawing region 451, an animation progress bar 456 is displayed. The animation progress bar 456 indicates an animation time position within the step when assembly of parts is described using animation. Here, details of the animation progress bar 456 will be described with reference to FIG. 24. As illustrated in FIG. 24, a handle of the animation progress bar 456 moves in accordance with reproduction of assembly animation to indicate the animation time position on a time axis bar. Further, a "mark indicating a joint point of blocks" on the bar indicates an animation time position when the blocks are assembled, that is, when one block is jointed with another block. The handle can be dragged, so that the user can repeatedly reproduce joint portions of blocks, or the like, using a mark on the bar as an indication.

Further, space setting of the drawing region 451 may be displayed in a state where blocks 452a to 452d to be assembled are, for example, not grounded and float in the air. Further, in the case where a plurality of units of blocks to be assembled is required, the number may be clearly indicated by displaying "x number".

Further, as illustrated in FIG. 23, joint surfaces of the blocks are highlighted and joint surfaces of the blocks are connected to each other with a line 453, a line 454 and a line 455. By this means, the user can intuitively recognize how to joint the blocks.

Block jointing animation will be described next with reference to FIG. 25. First, as illustrated in an animation image 48a in FIG. 25, animation in which the block 452b moves along 453 which connects the joint surfaces of the block 452a and the block 452b, and is jointed with the block 452a, is reproduced. Then, as illustrated in an animation image 48b, animation in which the block 452d moves along 455 which connects the joint surfaces of the block 452a and the block 452d, and is jointed with the block 452a, is reproduced. Subsequently, as illustrated in an animation image 48c, animation in which the block 452c moves along 454 which connects joint surfaces of the block 452a and the block 452c, and is jointed with the block 452a, is reproduced. Then, an image 48d of a state where assembly of the blocks is finished is displayed. By jointing of the blocks being indicated one by one with animation in the assembly description in this manner, the user can intuitively understand how to assemble the blocks.

Figure 25:
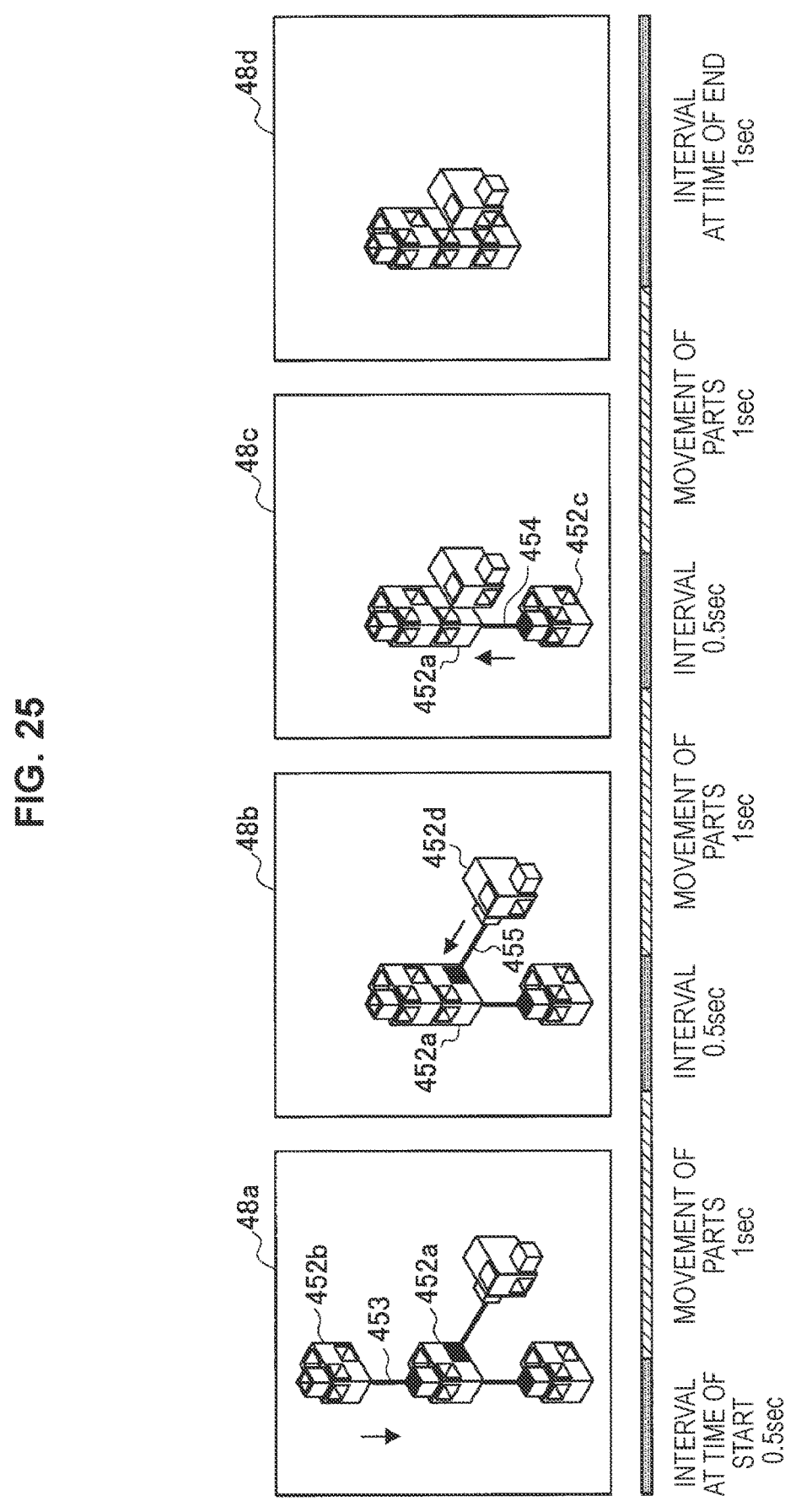
Figure 26:
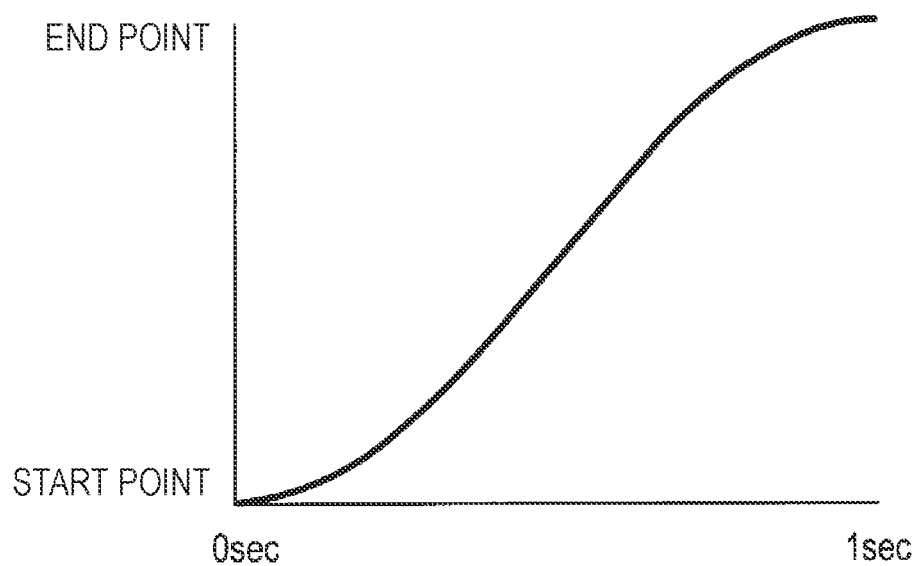
FIG. 26 is a diagram illustrating block migration time and an indication of easing for one-time jointing according to the embodiment.

In the example illustrated in FIG. 25, for example, upon start of animation, an interval of 0.5 sec is provided, in animation upon jointing, an interval of 1 sec is provided, and in animation between jointing and the next jointing, an interval of 0.5 sec is provided. Further, an interval of 1 sec is provided after the blocks are assembled. Here, FIG. 26 illustrates block migration time and an indication of easing of one-time jointing. As illustrated in FIG. 26, for example, block migration speed upon jointing does not have to be constant speed, and migration speed may be slow upon start and upon end. It is possible to reproduce operation upon jointing which is particularly important in slow motion with animation having varying pace in this manner.

Note that, while, in the jointing animation, a block is basically made to move on coordinate on one of X, Y and Z, in the case where a plurality of blocks is displayed, exceptional display may be performed. Here, FIG. 27 illustrates a diagram explaining another example of the jointing animation.

Figure 27:
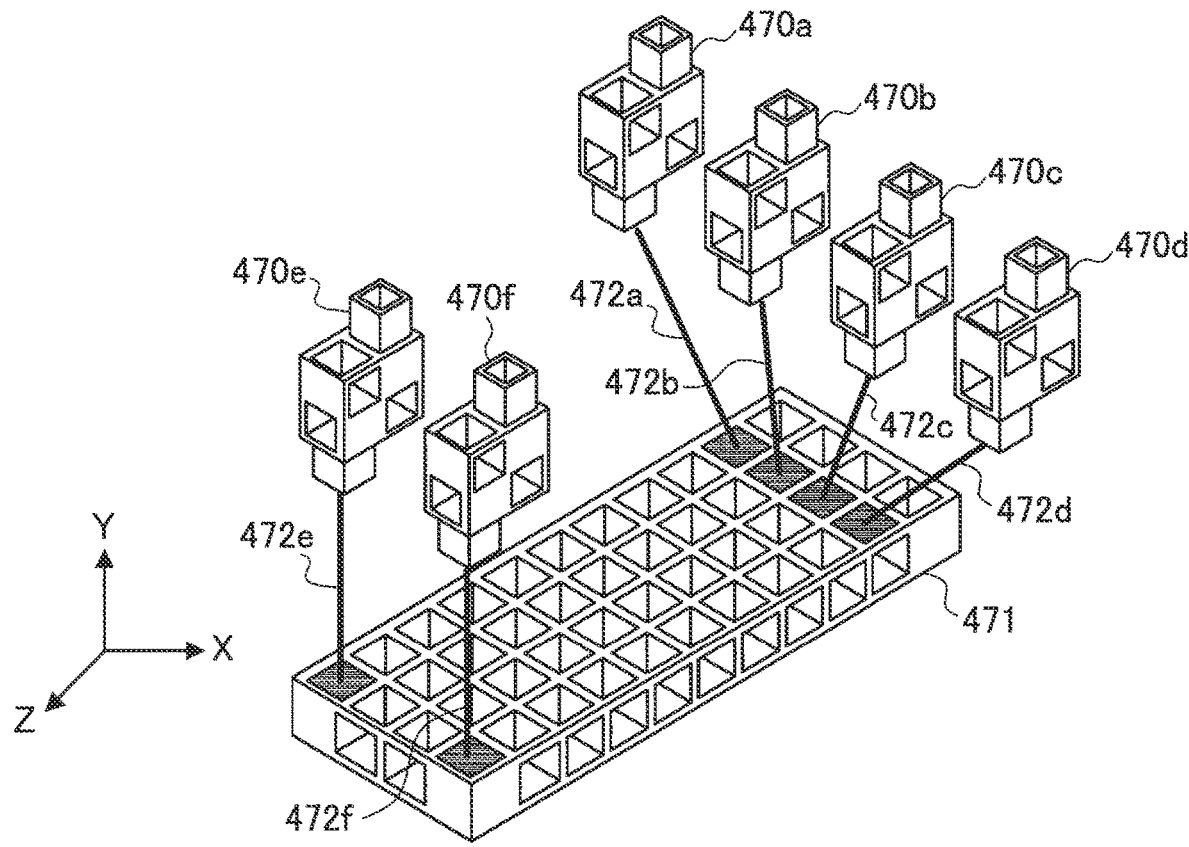
FIG. 27 is a diagram explaining another example of the jointing animation according to the embodiment.

As illustrated in FIG. 27, for example, when a plurality of blocks 470 is jointed with a block 471, animation in which a block 470e and a block 470f are jointed with the block 471 only through movement on the Y axis respectively along lines 472e and 472f which connect joint surfaces with the block 471 in a similar manner to that described in the above-described example, is reproduced. Meanwhile, because a block 470a, a block 470b, a block 470c and a block 470d overlap with each other, lines 472a to 472d which connect respective joint surfaces of the block 470 cannot be vertically expressed, and are displayed while an angle is formed as illustrated in FIG. 27, and animation in which the blocks sequentially and obliquely move along the lines 472a to 472d and are jointed, is reproduced.

Figure 28:
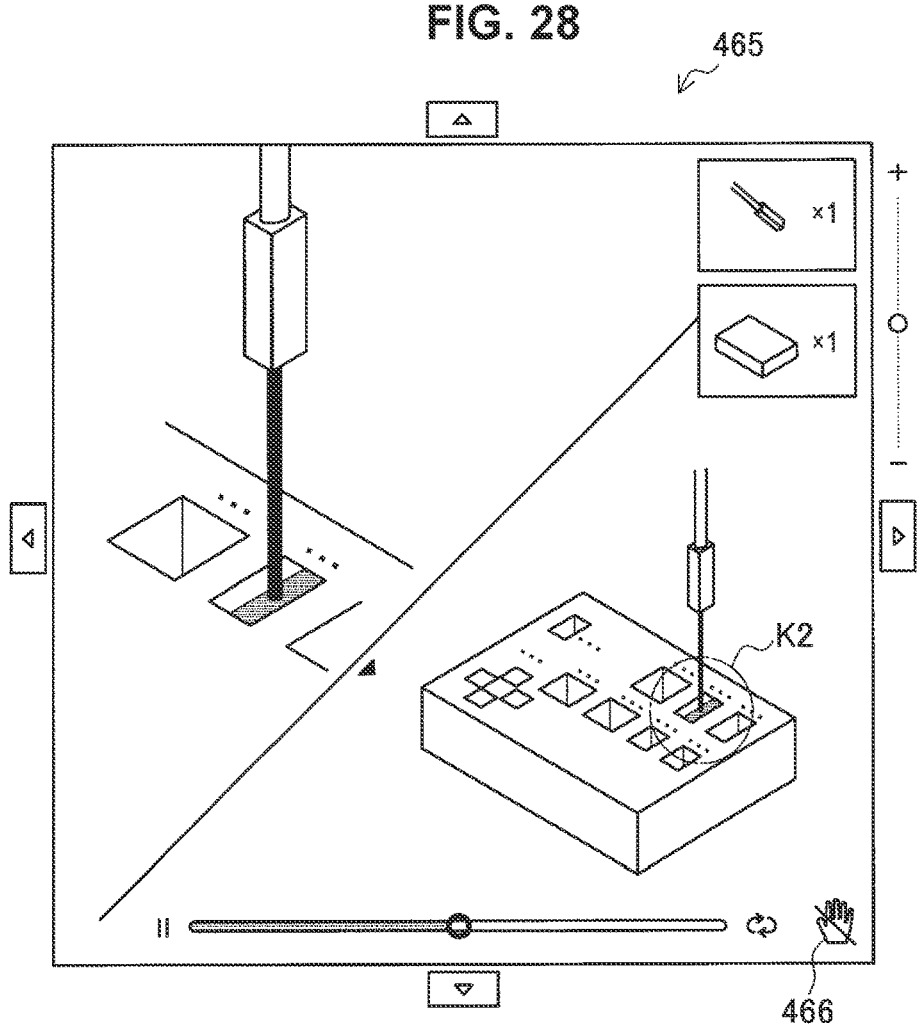
FIG. 28 is a diagram illustrating an example where a drawing region is divided into a plurality of portions and displayed according to the embodiment.

Further, the drawing region 451 may be divided into a plurality of portions. Here, FIG. 28 illustrates an example where the drawing region is divided into a plurality of portions. The illustrated drawing region 465 is divided with, for example, a dividing line from an upper right side to a lower left side. A ratio of division can be changed in accordance with layout. Further, as illustrated in FIG. 28, a connecting portion can be enlarged and displayed using screen division layout. Further, when cable connection is described, cable connection may be displayed at an angle at which silk of a cable can be seen. Still further, it is also possible to highlight a word (for example "K2") described at a connection destination of the cable. Further, in the case where a viewpoint cannot be changed because 2D objects are superimposed, an icon 466 indicating that the viewpoint cannot be changed is displayed, and a move button and the scaling control bar are disabled.

Figure 29:
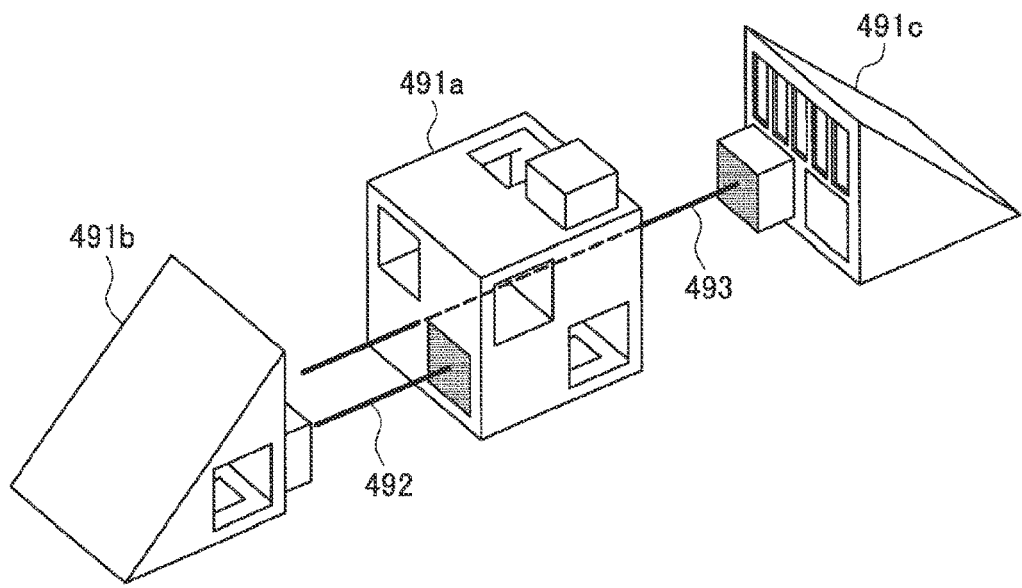
FIG. 29 is a diagram explaining another type of expression of a line connecting joint surfaces according to the embodiment.
Figure 30:
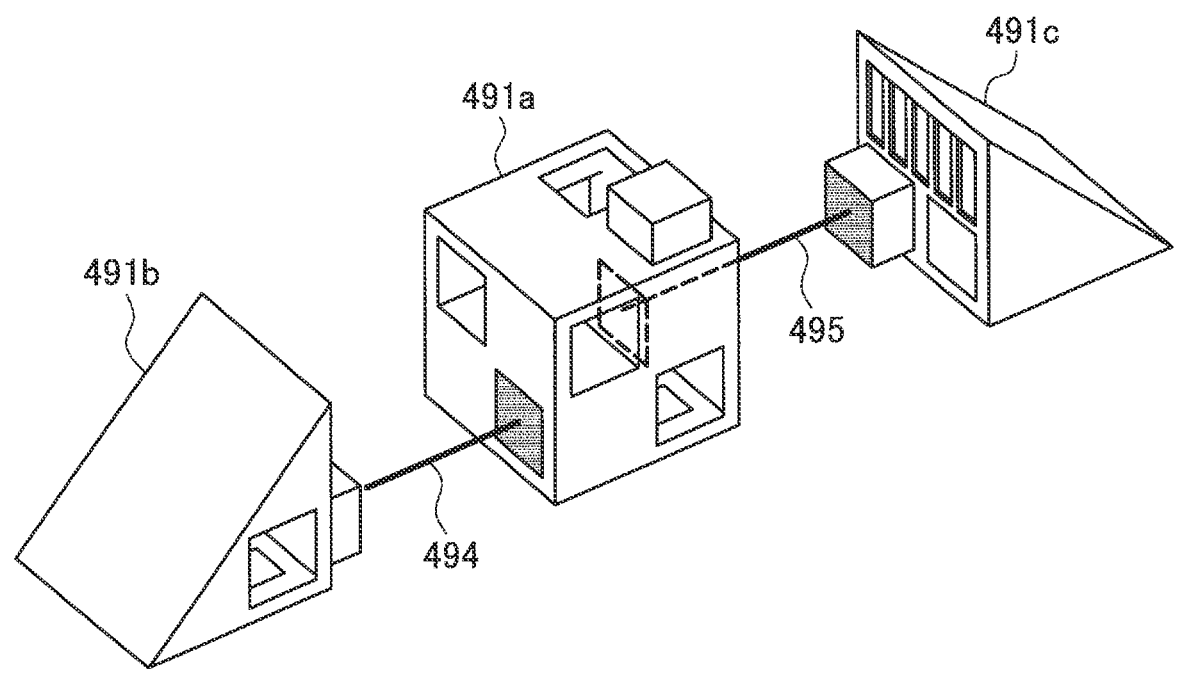
FIG. 30 is a diagram explaining another type of expression of the line connecting the joint surfaces according to the embodiment.

Further, display of a line connecting the joint surfaces of the blocks is not limited to the above-described examples. For example, in the case where the blocks are displayed at an angle at which the joint surfaces cannot be seen, because there is a case where it is difficult to understand to which surface the block should be jointed, the blocks may be displayed while hidden joint surfaces are taken into account. Here, FIG. 29 and FIG. 30 illustrate diagrams explaining other types of expression of a line connecting the joint surfaces. As illustrated in FIG. 29, for example, in a case of animation in which a block 491b and a block 491c are jointed to a block 491a, because a joint surface of the block 491a to which the block 491b is to be jointed can be seen, a line 492 which connects the joint surfaces is displayed in a similar manner to the above-described example. Meanwhile, because a joint surface of the block 491a to which the block 491c is to be jointed cannot be seen, a line 493 which connects the joint surfaces is displayed so as to penetrate through the block 491a. Further, as illustrated in FIG. 30, by indicating the joint surface of the block 491a to which the block 491c is to be jointed with a hidden line and extending a line 495 (a hidden line at a portion which is hidden by the block 491a) to the joint surface, it is possible to realize display which can be easily understood.

Further, in the case where blocks which are being assembled are displayed at a different angle in the next assembly step, it is also possible to switch display with smooth animation from display at an angle in the previous step. Here, FIG. 31 illustrates an example of animation across the steps. In the illustrated example, after animation in which an angle of a block 501 assembled in the previous step is rotated is displayed in an assembly description screen 50a, as indicated in an assembly description screen 50b, block jointing animation in the present step is displayed. Note that migration time and easing in the rotation animation may be curved in a similar manner to that in the example illustrated in FIG. 26. By this means, because animation in which the assembled blocks are rotated is displayed following the previous step before the blocks are suddenly displayed at a different angle across the steps, the user can intuitively understand that orientation of the assembled blocks is changed.

The assembly description screen according to the present embodiment has been specifically described above.

5. Creation of Assembly Description

Subsequently, processing when the above-described assembly description is created will be described with reference to FIG. 32 to FIG. 43. The processing of creating the assembly description can be executed when, for example, the new creation display 312 for generating a new robot recipe illustrated in FIG. 6 is selected. Alternatively, the processing can be executed using application for creating an assembly description screen.

Figure 32:
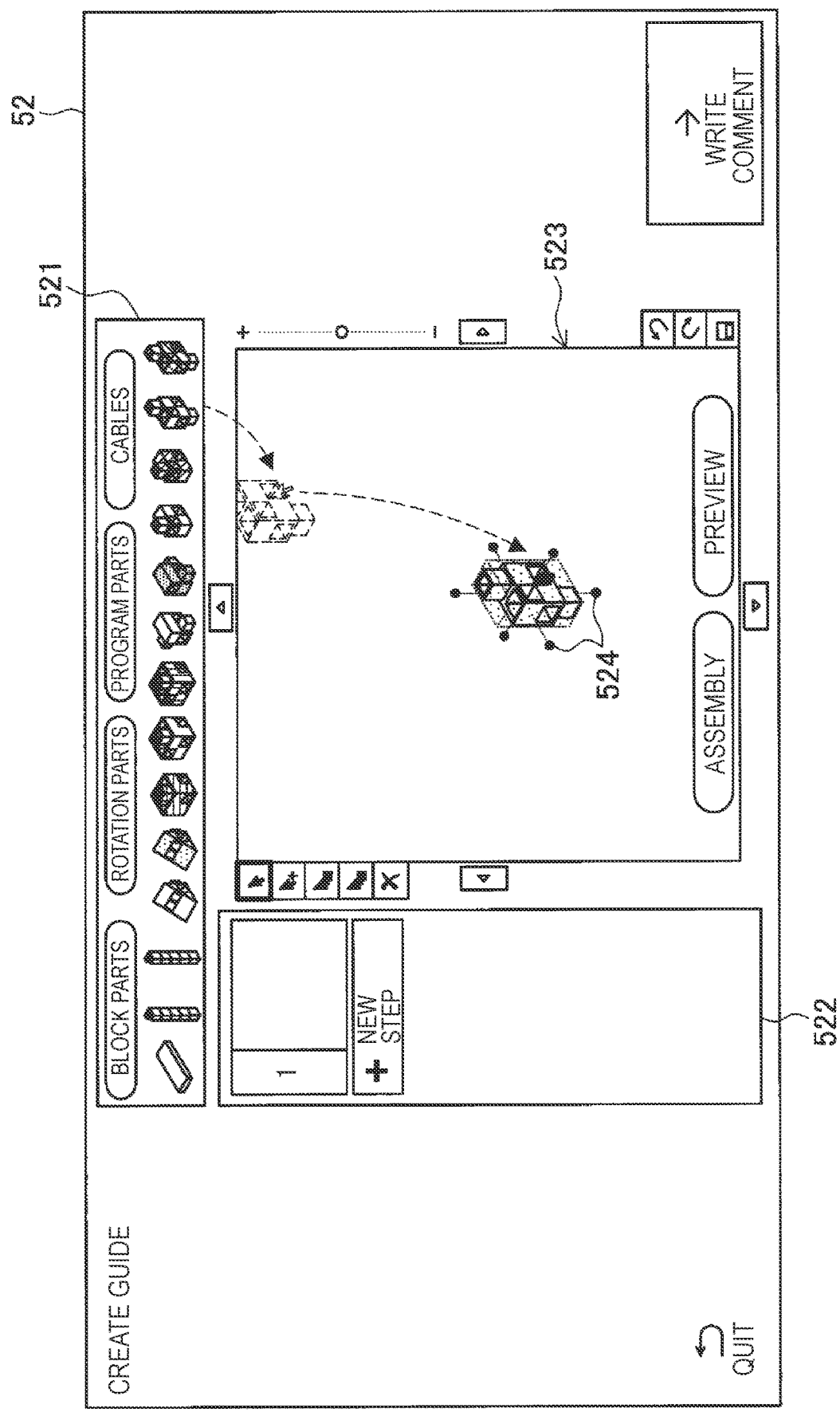
FIG. 32 is a diagram illustrating an example of a creation screen for assembly description according to the embodiment.

FIG. 32 is a diagram illustrating an example of a creation screen for the assembly description. In the illustrated creation screen 52, a block selection region 521, a step management region 522 and a work region 523 are displayed. If a block in the block selection region 521 is clicked, the selected block is lightly displayed in the work region 523, so that the user can confirm a shape of the block. Further, the user can move the selected block to the work region 523 by clicking and moving or dragging and dropping the selected block as illustrated in FIG. 32.

If a cursor enters the work region 523, the selected block is displayed in a state where the block is adsorbed to the cursor. The block is displayed so as to be horizontal, vertical or parallel to other blocks as initial orientation of the block when the block enters the work region 523 (adsorbed at 90 degrees). If the position is fixed by clicking, after the position is fixed, an indicating line 524 is displayed by the cursor being hovered as illustrated in FIG. 32. Note that examples of a way of canceling the block adsorbed to the cursor include clicking a cursor icon on an upper left side of the work region 523, clicking the same block again, depressing an Esc key, or the like.

Figure 33:
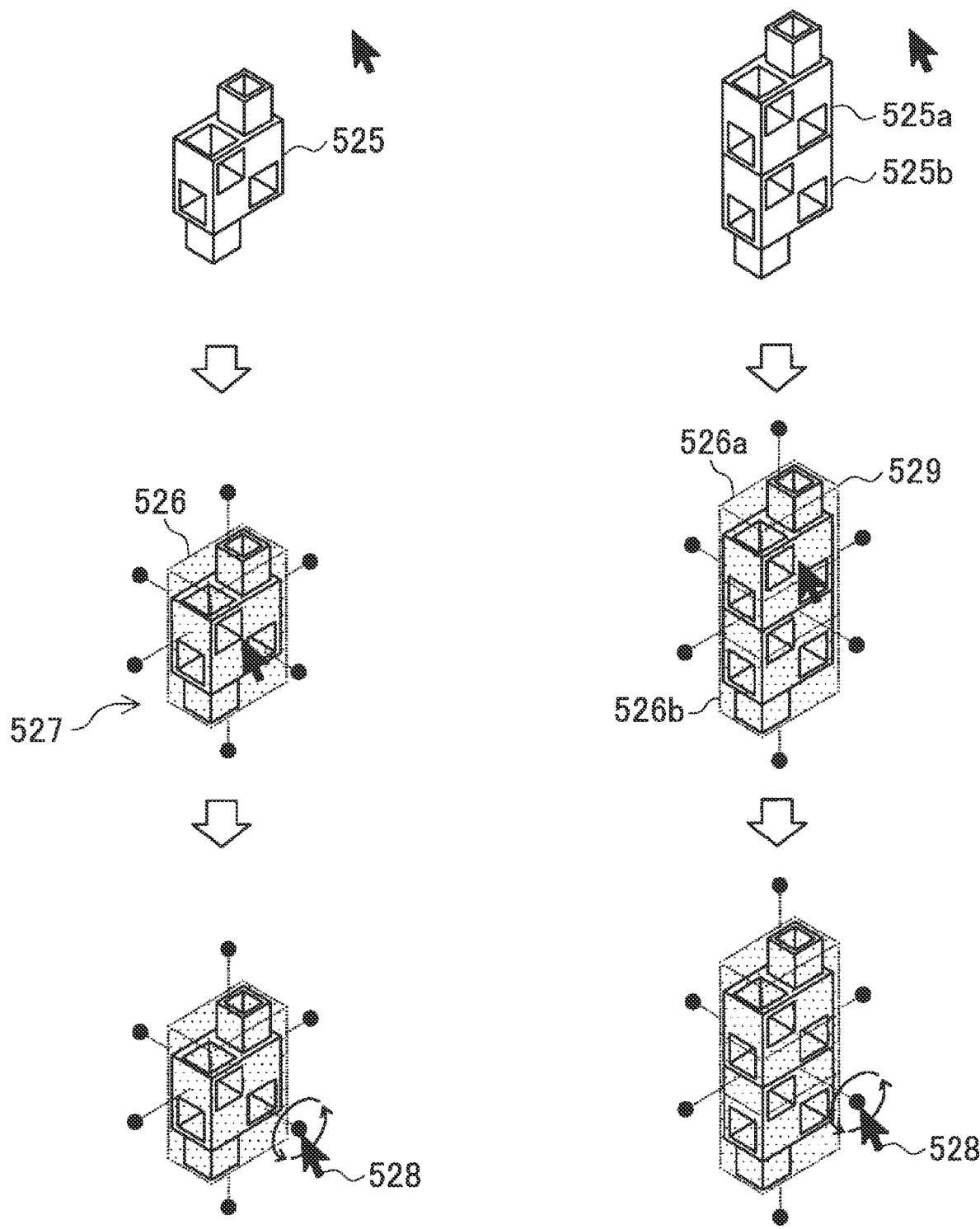
FIG. 33 is a diagram explaining block rotation operation according to the embodiment.

After the block is disposed within the work region 523, it is possible to rotate the block by operating the indicating line. Here, FIG. 33 illustrates a diagram explaining block rotation operation. In the illustrated example, if the cursor is separated from the block 525, only the block is displayed, and, if the cursor is hovered over the block 525, a selection frame 526 is displayed. In the case where the cursor is hovered over a plurality of jointed blocks (blocks 525a, 525b), selection frames 526a and 526b for the respective blocks are displayed in an overlapped manner.

Then, the indicating line 527 is extended from the center of the block 525. Upon selection of a plurality of blocks, indicating lines are extended from the centers of the plurality of blocks. The user can rotate the block by 45 degrees each, for example, by hovering the cursor 528 over a black circle portion at a tip of the indicating line and clicking the black circle portion. Further, it is also possible to freely move the block body by dragging and dropping the block or move the block while the X, Y and Z axes are fixed by dragging and dropping the indicating line.

Figure 34:
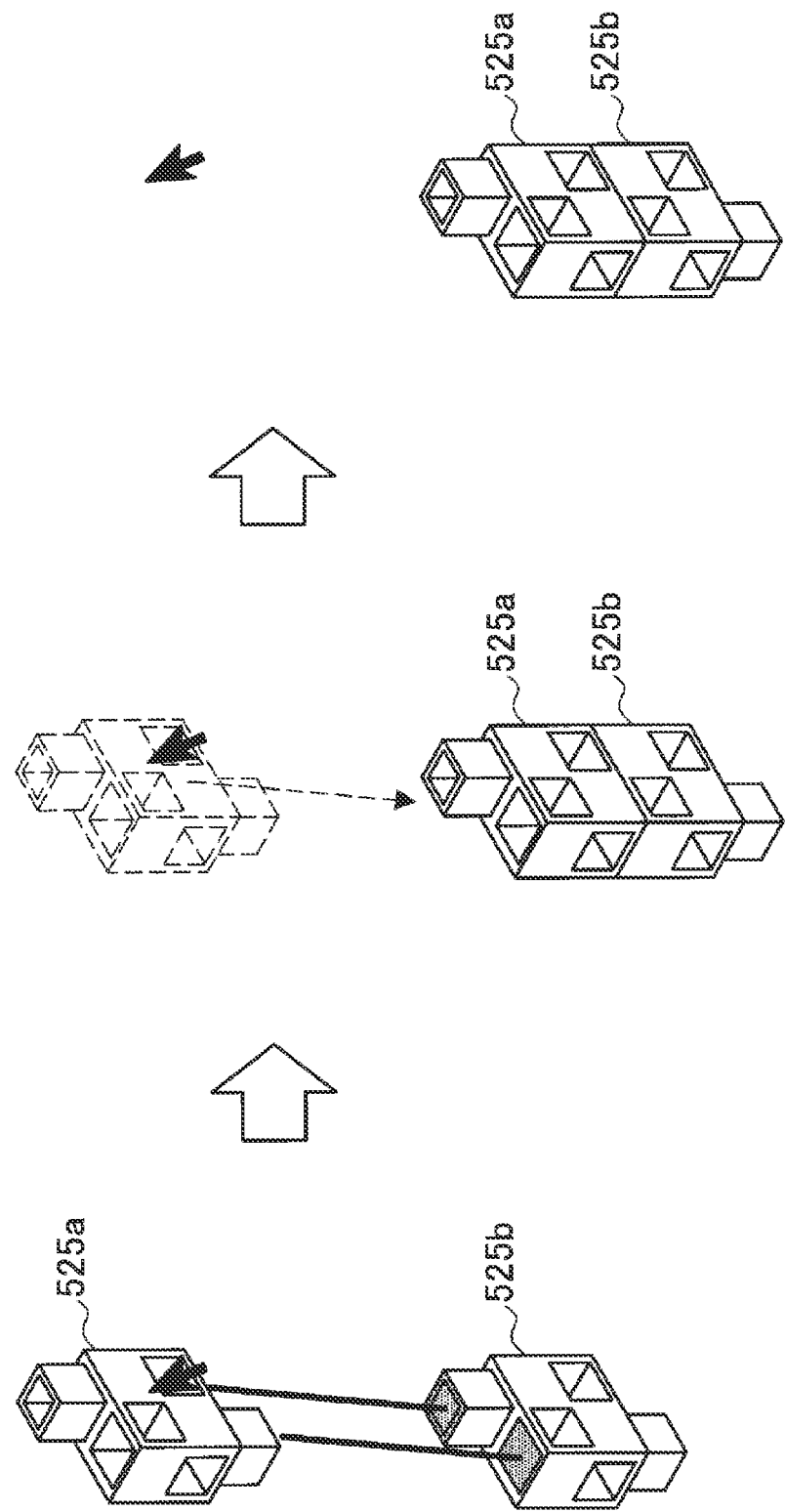
FIG. 34 is a diagram explaining joint of blocks through adsorption according to the embodiment.

Subsequently, joint of blocks through adsorption will be described with reference to FIG. 34. As illustrated in FIG. 34, if a block 525a is made to approach a block 525h, if there are surfaces to which the block 525a can be jointed on one of the X, Y and Z axes, the corresponding portions are highlighted and connection lines are displayed. Then, in the case where the position is fixed in a state where the position deviates from the axis, the position is automatically corrected, and the block is adsorbed and jointed to the highlighted surfaces.

Figure 35:
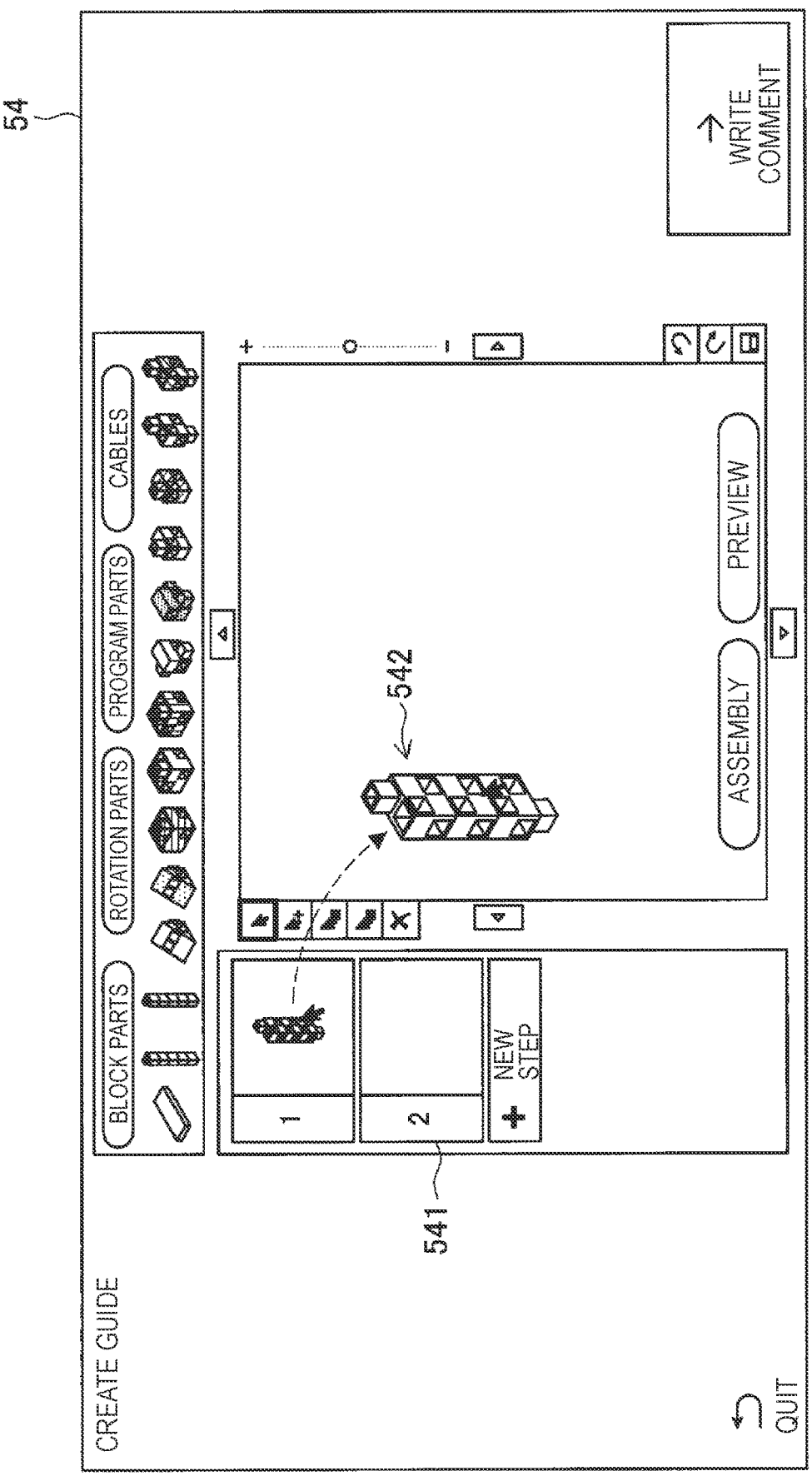
FIG. 35 is a diagram explaining a case where a block in a previous step is utilized in a new step according to the embodiment.

A case where the block in the previous step is utilized in a new step will be described next with reference to FIG. 35. If "new step" displayed on the creation screen 54 in FIG. 32 is tapped, as indicated in the creation screen 54 in FIG. 35, a second step 541 is added. Here, the block 542 which is created in a first step can be brought in a work region in the second step 541 by the block 542 being dragged and dropped.

Figure 36:
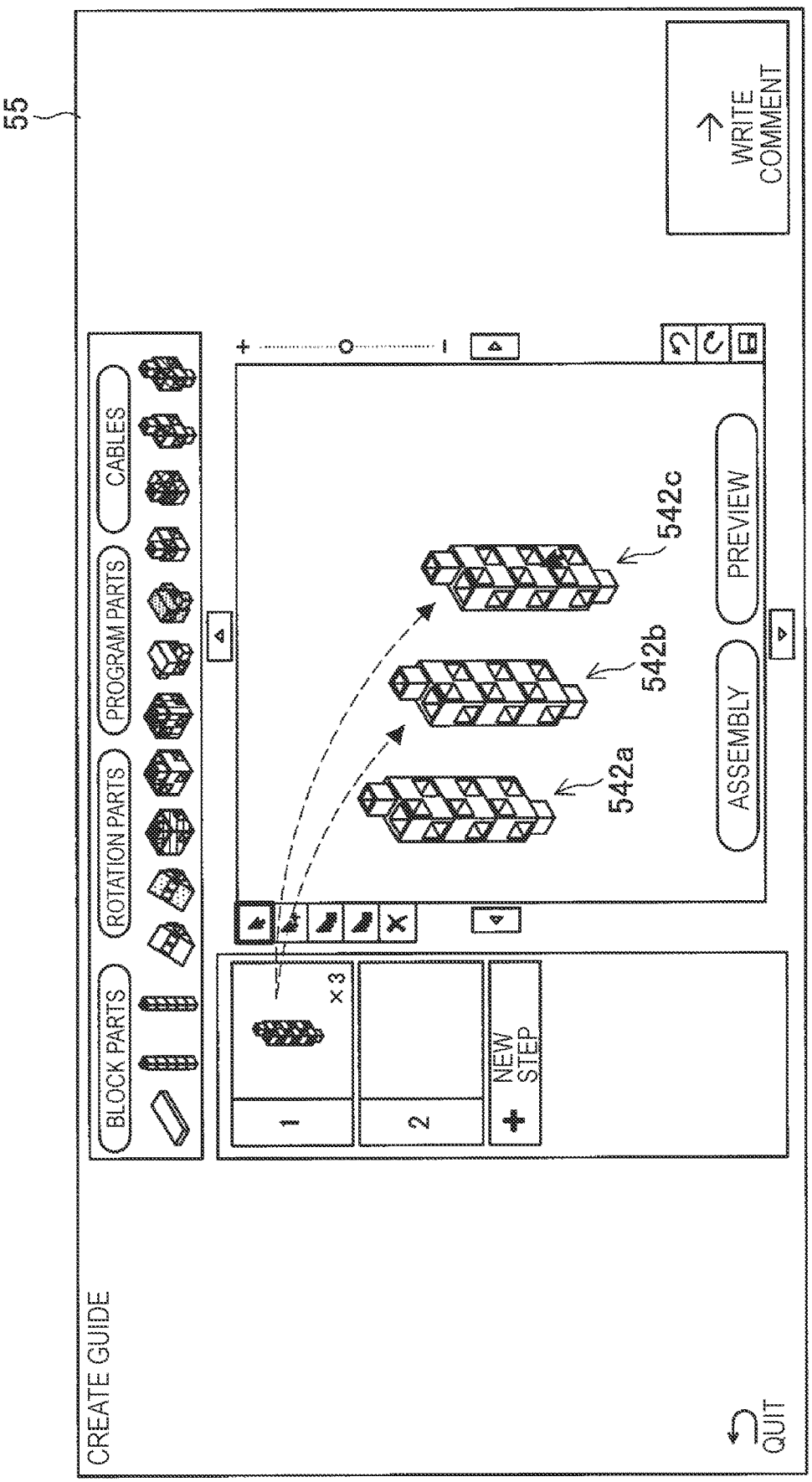
FIG. 36 is a diagram explaining a case where a plurality of blocks in a previous step is utilized according to the embodiment.

Note that, as illustrated in FIG. 36, in the case where a plurality of blocks (542a to 542c) in the previous step is brought, display of "x number" is added in an assembly step (the previous step) of the blocks.

Figure 37:
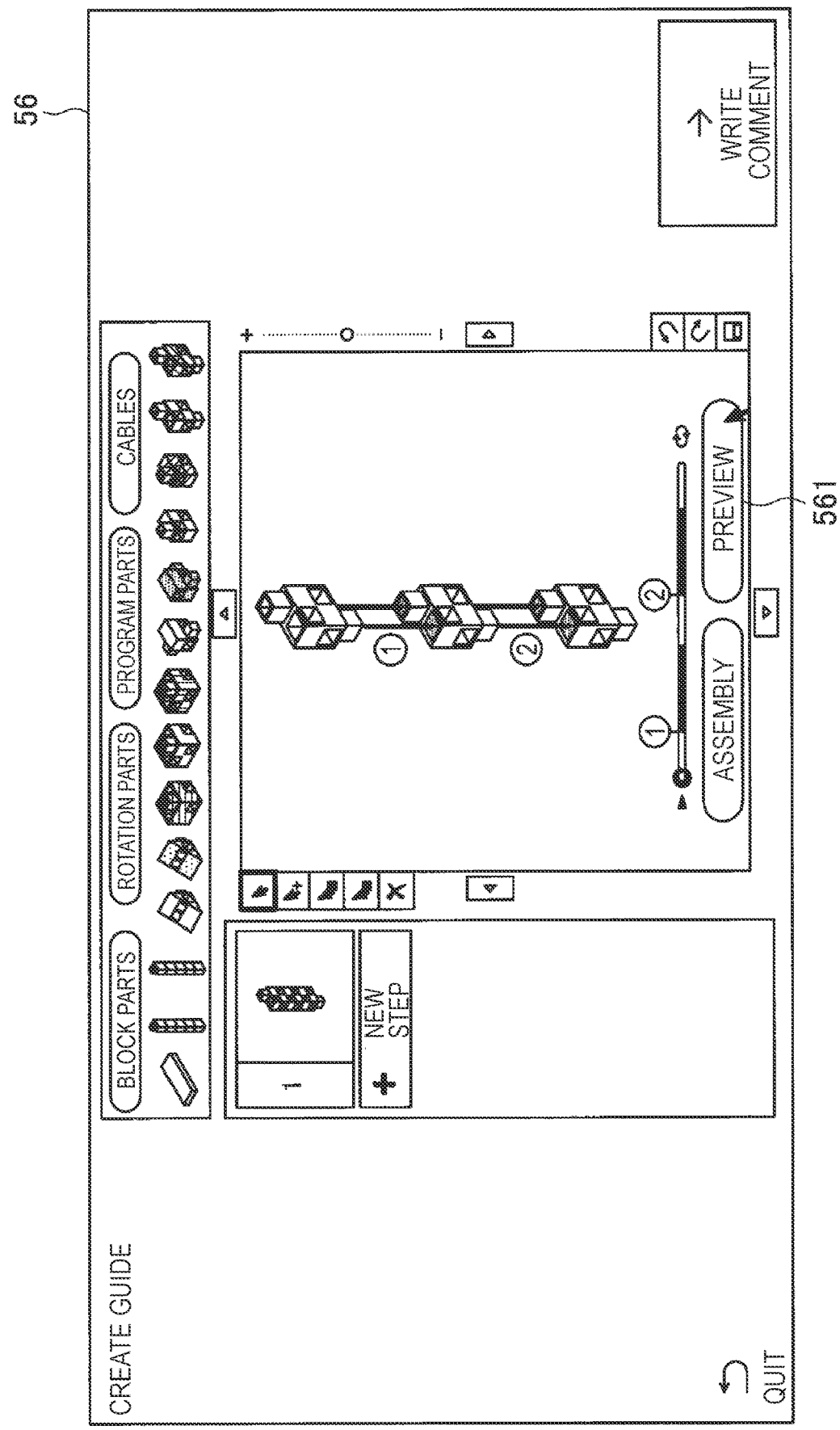
FIG. 37 is a diagram explaining a preview mode according to the embodiment.

A preview mode will be described next with reference to FIG. 37. As illustrated in FIG. 37, if a preview button 561 is tapped, the creation screen 56 enters a preview mode, a traveling control and a progress bar are displayed, the assembled blocks move to an animation start position, and temporary order of jointing animation based on the order in which the blocks are assembled is displayed. Further, the joint surfaces are highlighted, and lines connecting the joint surfaces are displayed.

A method for changing assembly order in the preview mode will be described next with reference to FIG. 38 and FIG. 39. As illustrated in a left portion of FIG. 38, order in jointing (assembly) animation is first temporarily determined on the basis of assembly history through user operation upon an assembly mode. For example, in the case where a block 571b is jointed to a block 571a, and, then, a block 571c is jointed and, then, a block 571d is jointed, order of jointing is provided in this order.

Figure 38:
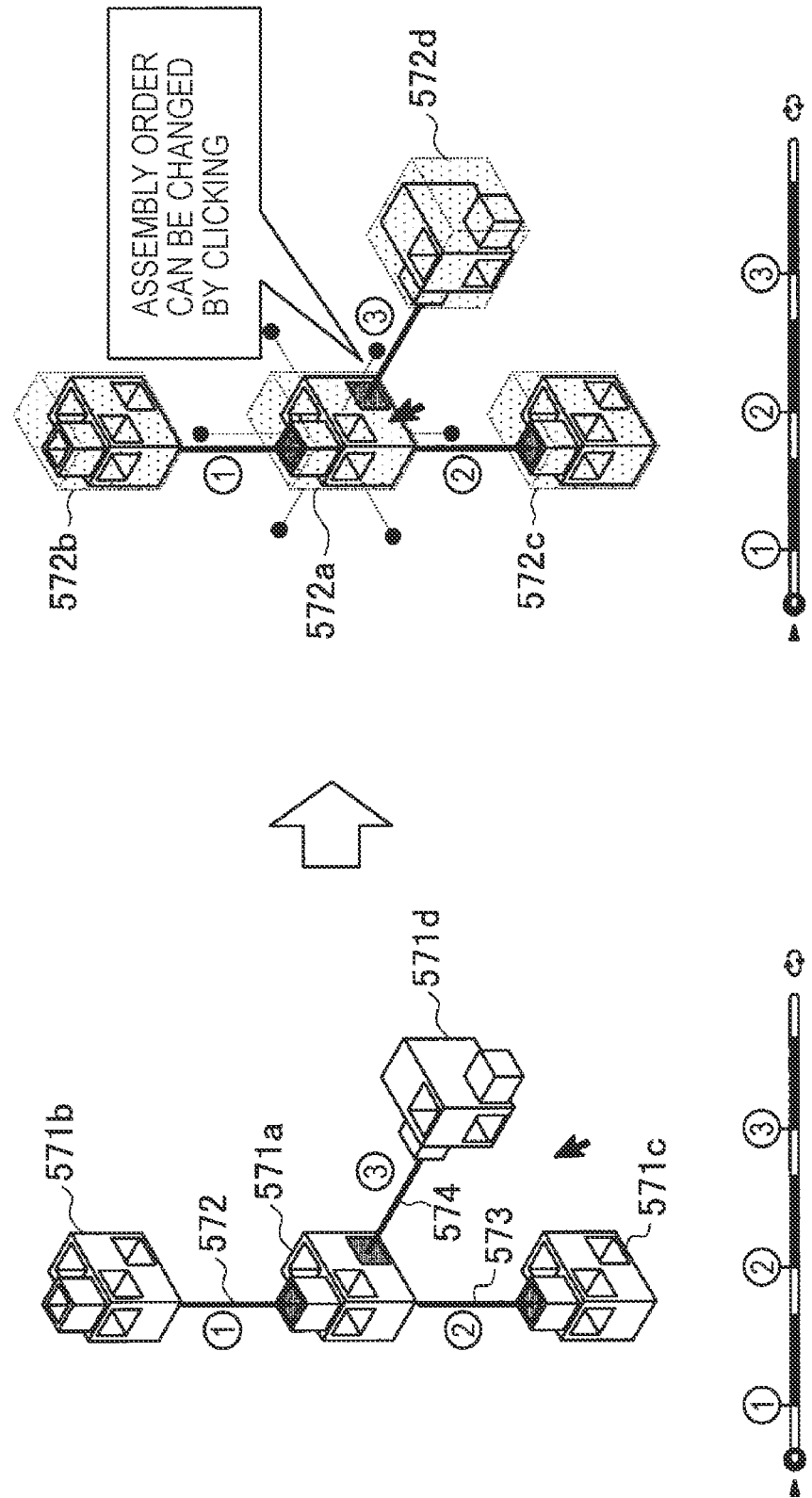
FIG. 38 is a diagram explaining a method for changing assembly order in the preview mode according to the embodiment.

In the case where such temporary order is changed, as illustrated in a right portion of FIG. 38, if the cursor is hovered over the block, selection frames 572 (572a to 572d) are displayed at all the blocks, and "assembly order can be changed by clicking" is displayed.

Then, as illustrated in a left portion of FIG. 39, for example, if the block 571a is clicked, the selection frame of the block disappears, and "select a block to be assembled next" is displayed. As illustrated in FIG. 39, in the case where there is a plurality of assembly destinations, order is not fixed until the counterpart is selected. Then, if the user clicks, for example, the block 571d as illustrated in a right portion of FIG. 39, first assembly is fixed. Note that, if a portion other than blocks is selected during setting of order, selection of order is cancelled, and the order returns to default order.

Figure 40:
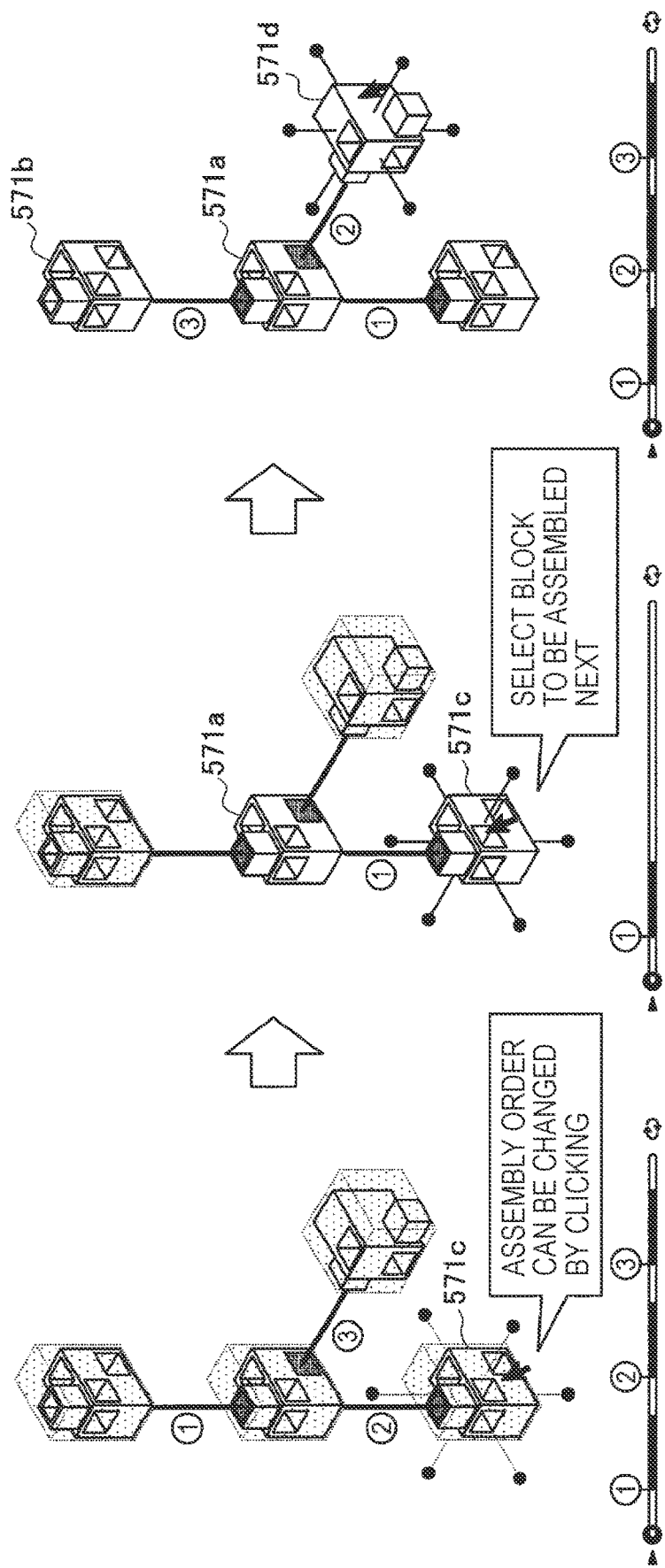
FIG. 40 is a diagram explaining another method for changing the assembly order in the preview mode according to the embodiment.

Another method for changing the assembly order in the preview mode will be described next with reference to FIG. 40. As illustrated in a left portion of FIG. 40, in the case where there is one assembly destination of the block 571c which is clicked first, as illustrated in a central portion of FIG. 40, the selection frame of the block 571a which becomes the assembly counterpart disappears, and first assembly is fixed. Then, as illustrated in a right portion of FIG. 40, if the block 571d is fixed as second assembly, because, in this example, the third assembly destination (that is, the block 571b) is naturally fixed, all the selection frames disappear.

A method for changing an animation start point in the preview mode will be described next with reference to FIG. 41. In the preview mode, it is possible to change the animation start point by dragging a block.

For example, as illustrated in a left portion of FIG. 41, in a case of movement only on the same axis (in an example illustrated in FIG. 41, on the Y axis), only a movement distance of animation is changed, and migration time is not changed.

Meanwhile, in a case of movement on two or more axes an example illustrated in FIG. 41, on the Y axis and the X axis) as illustrated in a right portion of FIG. 41, the movement becomes two-staged movement via a default animation start point. Such two-staged movement will be described with reference to FIG. 42.

Figure 42:
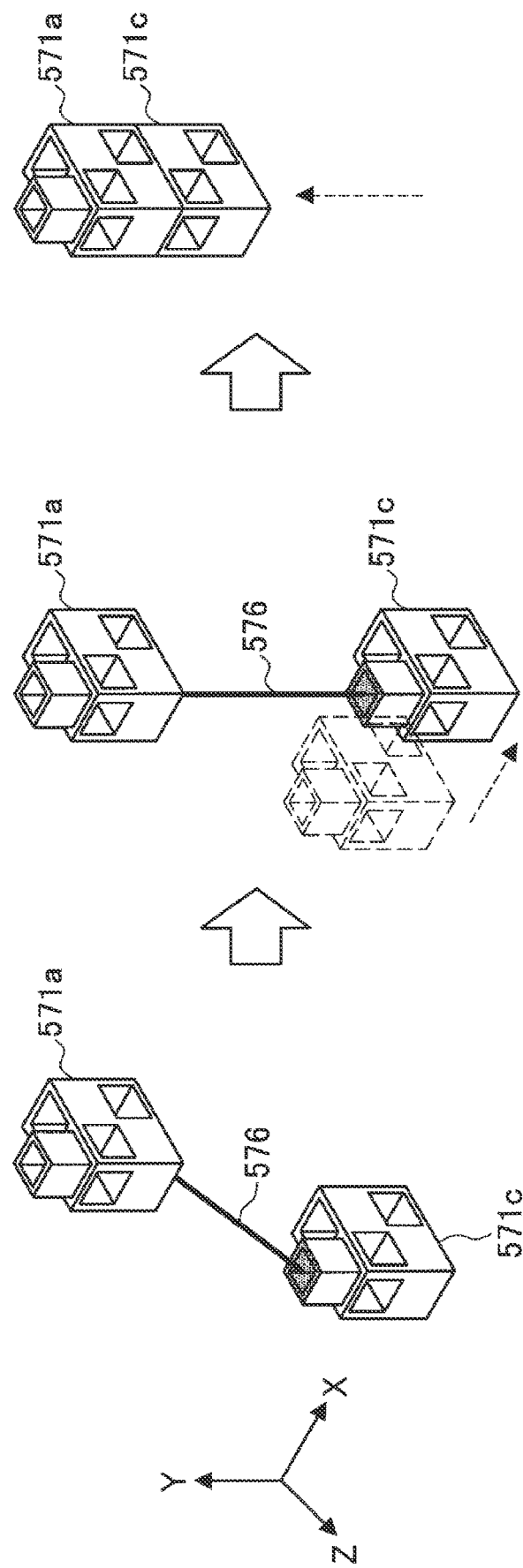
FIG. 42 is a diagram explaining two-staged movement by change of the animation start point according to the embodiment.
Figure 43:
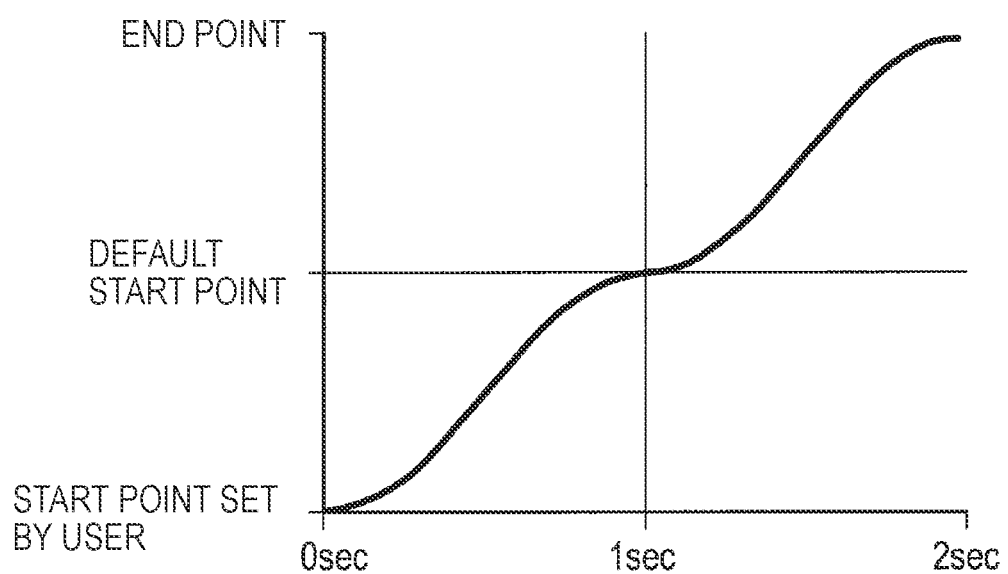
FIG. 43 is a diagram explaining migration time in the two-staged movement according to the embodiment.

As illustrated in a left portion and a central portion of FIG. 42, for example, animation becomes animation of two-staged movement in which a block 571c moves on the X axis and passes through a default start point, and as illustrated in a right portion of FIG. 42, moves on the Y axis and is jointed to a block 571a. Migration time and easing of such two-staged movement may be set such that animation is made slow before and after the default start point in addition to a migration start point and an end point (upon jointing) as illustrated in, for example, FIG. 43.

6. Conclusion

As described above, in the information processing system according to the embodiment of the present disclosure, it is possible to improve user-friendliness of a description screen for assembly of parts in creation of a robot.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, it is also possible to create a computer program for causing hardware such as a CPU, a ROM and a RAM incorporated in to the above-described client terminal 1 or server 2 to fulfill functions of the client terminal 1 or the server 2. Further, a computer-readable storage medium which stores the computer program is also provided.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)
An information processing apparatus including a display control unit configured to:
separately display a plurality of parts for creation of a robot,
display a line connecting joint surfaces of the respective parts, and
display animation in which the respective parts are jointed in accordance with the line connecting the joint surfaces in assembly order.

(2)
The information processing apparatus according to (1),
in which the control unit performs control such that the joint surfaces are highlighted.

(3)
The information processing apparatus according to (1) or (2),
in which the control unit performs control to additionally display a progress bar which displays an animation time position in an assembly step.

(4)
The information processing apparatus according to (3),
in which a mark indicating a joint time position in the assembly step is displayed in the progress bar.

(5)
The information processing apparatus according to any one of (1) to (4),
in which the control unit performs control such that speed of animation in which the parts are jointed is made slow at times of start and end of movement.

(6)
The information processing apparatus according to any one of (1) to (5), in which the control unit generates assembly description information for creation of a robot in accordance with a learning course.

(7)

The information processing apparatus according to (6), in which the learning course includes a plurality of stages, and the stage includes a plurality of missions.

(8)

The information processing apparatus according to (7), in which the learning course, the stages and the missions change in accordance with a learning level of a user.

(9)

An information processing method including performing display control by a processor to:

separately display a plurality of parts for creation of a robot, display a line connecting joint surfaces of the respective parts, and display animation for jointing the respective parts in accordance with the line connecting the joint surfaces in assembly order.

(10)

A program for causing a computer to function as a display control unit configured to:

separately display a plurality of parts for creation of a robot, display a line connecting joint surfaces of the respective parts, and display animation for jointing the respective parts in accordance with the line connecting the joint surfaces in assembly order.

REFERENCE SIGNS LIST 1 client terminal
2 server
3 network
5 robot
10 control unit
11 communication unit
12 operation input unit
13 camera
14 display unit
15 storage unit
20 control unit
21 communication unit
22 storage unit
30 menu screen
31 search screen
32 condition selection screen
33 search result screen
34 detailed information display screen
35 learning course selection screen
38 mission screen
39 medal collection screen
40 free creation screen
41 program creation screen
42 collection screen
43 start screen
45 assembly description screen
48a to 48c animation image
48d image
50a, 50b assembly description screen
52 creation screen
54 creation screen
56 creation screen
301 robot recipe
302 learning course
303 free creation
304 collection
311 robot recipe data
312 new creation display
411 display screen
412 work region
413 program transfer button
451 drawing region
452a to 452d block
453 to 455 line
456 animation progress bar
458 caption region
460 scaling control bar
461 direction button
465 drawing region

The invention claimed is:

1. An information processing apparatus comprising
a control unit configured to perform display control to
separately display a plurality of parts for creation of a robot,
display a line connecting joint surfaces of respective parts of the plurality of parts,
display animation in which the respective parts are jointed in accordance with the line connecting the joint surfaces in assembly order, and
display a progress bar which displays an animation time position in an assembly step,
wherein, in a case where the plurality of parts are displayed at an angle at which one or more of the joint surfaces of one part of the respective parts cannot be seen and the one or more joint surfaces of the one part of the respective parts are displayed having a line connecting to other joint surfaces of respective parts of the plurality of parts, the one or more joint surfaces of the one part of the respective parts displayed having the line connecting to the other joint surfaces of the respective parts have a perimeter displayed as broken lines, and each surface of the one part of the respective parts that cannot be seen and not having the line connecting to the other joint surfaces of the respective parts do not have respective perimeters displayed as broken lines,
wherein the plurality of parts displayed are different than the line,
wherein the control unit is further configured to perform control to display a mark, indicating a joint time position in the assembly step, with the progress bar when one part of the plurality of parts is jointed with another part of the plurality of parts, and
wherein the control unit is implemented via at least one processor.

2. The information processing apparatus according to claim 1,
wherein the control unit is further configured to perform control such that the joint surfaces are highlighted.

3. The information processing apparatus according to claim 1,
wherein the control unit is further configured to perform control such that speed of animation in which the parts are jointed is made slow at times of start and end of movement.

4. The information processing apparatus according to claim 1,
wherein the control unit is further configured to generate assembly description information for creation of a robot in accordance with a learning course.

5. The information processing apparatus according to claim 4,
wherein the learning course includes a plurality of stages, and the stage includes a plurality of missions.

6. The information processing apparatus according to claim 5,
wherein the learning course, the plurality of stages, and the plurality of missions change in accordance with a learning level of a user.

7. The information processing apparatus according to claim 1,
wherein, in a case where the plurality of parts are displayed at an angle at which one of the joint surfaces of one part of the respective parts cannot be seen, one portion of the line that is not hidden by the one part is displayed having a first appearance and another portion of the line that is hidden by the one part is displayed having a second appearance different than the first appearance so as to penetrate through the one part, and
wherein the first appearance includes only a solid line and the second appearance includes only a broken line.

8. The information processing apparatus according to claim 7,
wherein, in the case where the plurality of parts are displayed at the angle at which the one or more joint surfaces of the one part of the respective parts cannot be seen, the one or more joint surfaces of the one part are indicated with broken lines and other joint surfaces of the one part that can be seen are indicated with solid lines.

9. The information processing apparatus according to claim 1, wherein surfaces of the one part of the respective parts that cannot be seen and having a perimeter displayed as solid lines include only joint surfaces not having the line connecting to the other joint surfaces of the respective parts.

10. An information processing method comprising
performing display control by a processor to
separately display a plurality of parts for creation of a robot,
display a line connecting joint surfaces of respective parts of the plurality of parts,
display animation for jointing the respective parts in accordance with the line connecting the joint surfaces in assembly order, and
display a progress bar which displays an animation time position in an assembly step,
wherein, in a case where the plurality of parts are displayed at an angle at which one or more of the joint surfaces of one part of the respective parts cannot be seen and the one or more joint surfaces of the one part of the respective parts are displayed having a line connecting to other joint surfaces of respective parts of the plurality of parts, the one or more joint surfaces of the one part of the respective parts displayed having the line connecting to the other joint surfaces of the respective parts have a perimeter displayed as broken lines, and each surface of the one part of the respective parts that cannot be seen and not having the line connecting to the other joint surfaces of the respective parts do not have respective perimeters displayed as broken lines,
wherein the plurality of parts displayed are different than the line, and
wherein the method further comprises performing the display control by the processor to display a mark, indicating a joint time position in the assembly step, with the progress bar when one part of the plurality of parts is jointed with another part of the plurality of parts.

11. A non-transitory computer-readable medium having embodied thereon a program, which when executed by a computer causes the computer to execute a method, the method comprising:
performing display control to
separately display a plurality of parts for creation of a robot,
display a line connecting joint surfaces of respective parts of the plurality of parts,
display animation for jointing the respective parts in accordance with the line connecting the joint surfaces in assembly order, and
display a progress bar which displays an animation time position in an assembly step,
wherein, in a case where the plurality of parts are displayed at an angle at which one or more of the joint surfaces of one part of the respective parts cannot be seen and the one or more joint surfaces of the one part of the respective parts are displayed having a line connecting to other joint surfaces of respective parts of the plurality of parts, the one or more joint surfaces of the one part of the respective parts displayed having the line connecting to the other joint surfaces of the respective parts have a perimeter displayed as broken lines, and each surface of the one part of the respective parts that cannot be seen and not having the line connecting to the other joint surfaces of the respective parts do not have respective perimeters displayed as broken lines,
wherein the plurality of parts displayed are different than the line, and
wherein the method further comprises performing the display control to display a mark, indicating a joint time position in the assembly step, with the progress bar when one part of the plurality of parts is jointed with another part of the plurality of parts.

* * * * *